United States Patent [19]
Martell

[11] Patent Number: 5,761,476
[45] Date of Patent: Jun. 2, 1998

[54] NON-CLOCKED EARLY READ FOR BACK-TO-BACK SCHEDULING OF INSTRUCTIONS

[75] Inventor: Robert W. Martell, Hillsboro, Oreg.

[73] Assignee: Intel Corporation, Santa Clara, Calif.

[21] Appl. No.: 801,030

[22] Filed: Feb. 19, 1997

Related U.S. Application Data

[63] Continuation of Ser. No. 511,450, Aug. 4, 1995, abandoned, which is a continuation of Ser. No. 176,012, Dec. 30, 1993, abandoned.

[51] Int. Cl.$^6$ .......................................................... G06F 9/38
[52] U.S. Cl. ........................... 395/395; 395/393; 395/572; 395/800.23
[58] Field of Search ........................................ 395/393, 395, 395/572, 800.23

[56] References Cited

U.S. PATENT DOCUMENTS

| | | | |
|---|---|---|---|
| 5,222,244 | 6/1993 | Carbine et al. | 395/800 |
| 5,293,592 | 3/1994 | Fu et al. | 395/375 |
| 5,293,603 | 3/1994 | MacWilliams et al. | 395/425 |

OTHER PUBLICATIONS

Author, Mike Johnson, entitled *Superscalar Microprocessor Design*, Advance Micro Devices, Prentice Hall Series in Innovative Technolgoy, 1991, pp. 1–289.
Val Popescu, et al.entitled, "The Metaflow Architecture," IEEE Micro, Jun. 1991,pp. 10–13, 63–73.

Primary Examiner—Alyssa H. Bowler
Assistant Examiner—John Follansbee
Attorney, Agent, or Firm—Blakely, Sokoloff, Taylor & Zafman

[57] ABSTRACT

A mechanism and method providing an early read operation of data associated with an instruction dispatched for execution to provide data dependency information in time to be used for scheduling subsequent instructions which may execute back-to-back in a pipeline microprocessor. The present invention provides the above functionality for instructions following single cycle instructions. The present invention provides immediate scheduling of instructions that are dependent on single cycle instructions. A reservation station holds the information pertaining to instructions that are to be scheduled for execution. The early read logic is implemented so that an address of a destination register associated with a dispatched single cycle instruction can be read from the associated entry of the reservation station early enough so as to be used and compared against the addresses of source registers of other instructions waiting to be scheduled (a CAM match). In this way, a subsequent instruction can be made ready for scheduling within a single clock cycle following the dispatch stage of the previously dispatched instruction to achieve maximum throughput efficiency. The present invention utilizes a non-clocked read memory to perform the early read operation of the address of the destination register of the reservation station while the remainder of the reservation station utilizes a clocked-read implementation and memory.

37 Claims, 17 Drawing Sheets

108

| | RESULT DATA | LDST |
|---|---|---|
| | | |
| | | |
| | | |
| | | |
| ROB$_5$ | DATA | EAX |
| ROB$_6$ | DATA | EBX |
| ROB$_7$ | DATA | EAX |
| ROB$_8$ | DATA | ECX |
| ROB$_9$ | DATA | ECX |
| ROB$_{10}$ | DATA | EDX |
| ROB$_{11}$ | DATA | EDX |
| ROB$_{12}$ | DATA | t |
| ROB$_{13}$ | DATA | t |

FIGURE 2B

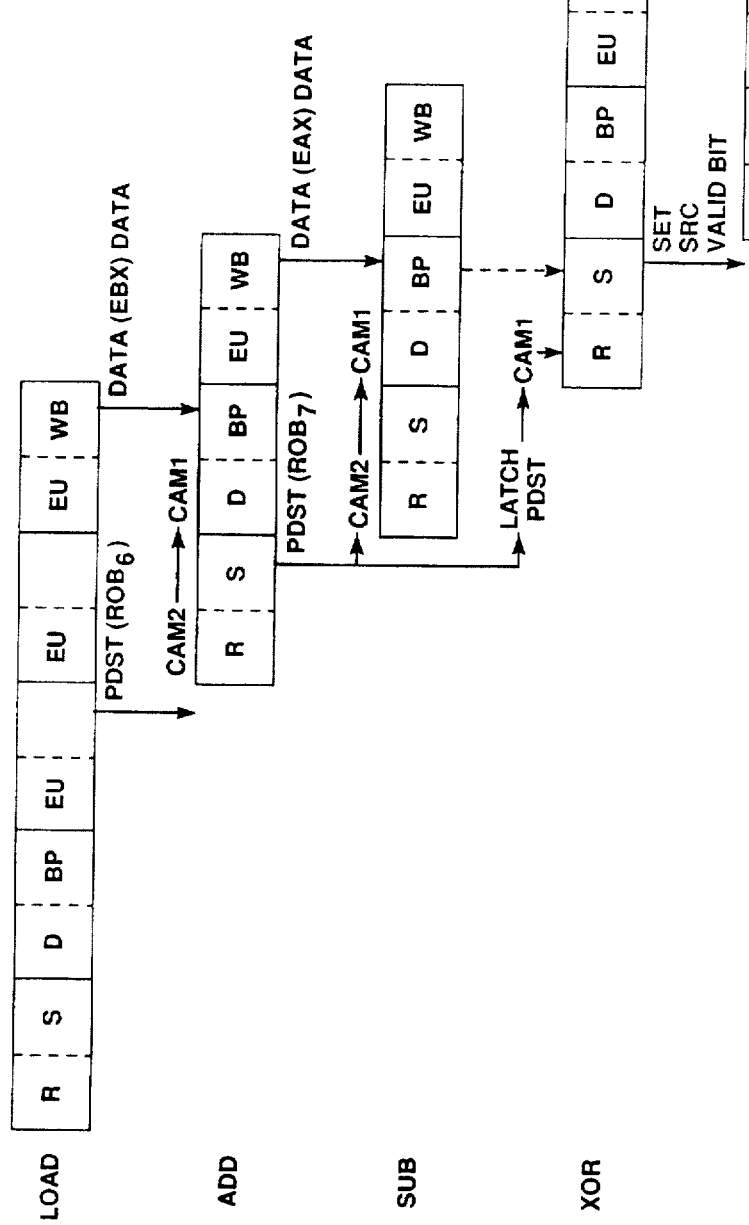

NON-CLOCKED EARLY READ FOR BACK-TO-BACK SCHEDULING OF INSTRUCTIONS

This is a continuation of application Ser. No. 08/511,450, filed Aug. 4, 1995, now abandoned, which is a continuation of application Ser. No. 08/176,012, filed Dec. 30, 1993, now abandoned.

BACKGROUND OF THE INVENTION

(1) Field of the Invention

The present invention relates to the field of processor architecture. More specifically, the present invention relates to the field of instruction scheduling mechanisms within a pipeline microprocessor.

(2) Prior Art

Some non-pipeline microprocessors generally process instructions one at a time with each instruction having four sequential stages: instruction fetch, instruction decode, execute, and result write back to the register file or memory. Within such microprocessors, different dedicated logic blocks perform each processing stage. Each logic block waits until all the previous logic blocks complete operations before beginning its operation. Therefore, assuming each instruction stage consumes a single clock cycle, it would take 12 clock cycles to execute three instructions in sequence using a non-pipeline microprocessor (4 stages per instruction).

To improve microprocessor efficiency, microprocessor designers overlap the individual stages of the fetch, decode, execute, and write back stages such that the microprocessor operates on several instructions simultaneously. In operation, the fetch, decode, execute, and write back stages concurrently process different instructions. At each clock cycle the results of each processing stage are passed to the following processing stage. Microprocessors that use the technique of overlapping the fetch, decode, execute, and write back stages are known as "pipeline" microprocessors.

Using a pipeline approach it can be seen that the maximum throughput that can be realized to execute three instructions back-to-back is 6 clock cycles. Four cycles to execute the first instruction, and since the pipelines overlap for the second and third instruction, each adds only one stage to the total result (4+1+1). Compared to the non-pipeline stage, for the above example, processing speed is effectively doubled. However, the above example assumes that no data dependencies exist between the three sample instructions.

For example, assume that the second instruction requires the data output from the first instruction a source operand. Given our example above, the second instruction needs the data generated by the first instruction and therefore may have to wait for the data to become available from the first instruction before the second instruction may complete. Therefore, true data dependencies may impact on the processing throughput of back-to-back instruction execution. For example, assume that it takes two clock cycles for the first instruction to generate the data and place it into a register where the second instruction may retrieve the data. This process may add two clock cycles to the execution time of the second instruction. Assuming the third instruction is also dependent on the results of the second instruction, the maximum throughput of this exemplary processor becomes 8 clock cycles (4+2+2) instead of 6 clock cycles. In this example, the data dependencies between the three sample instructions increased the overall processing time required to execute these instructions in excess of the maximum throughput time of 6 clock cycles.

Therefore, it would be advantageous to be able to provide maximum instruction throughput for back-to-back execution of instructions that may be data dependent on each other. It would be further advantageous to provide the above functionality for single execution cycle instructions ("single cycle" instructions). The present invention provides such advantageous results.

Accordingly, it is an object of the present invention to increase processor efficiency within a pipeline microprocessor. It is further an object of the present invention to provide a mechanism that allows maximum instruction throughput for back-to-back instructions that may be data dependent. It is yet another object of the present invention to provide a mechanism for providing an early read operation of data associated with an instruction dispatched for execution; the data associated with the early read operation is used to schedule subsequent back-to-back operations. It is another object of the present invention to utilize the generated vectors to schedule a set of data dependent instructions so that single execution cycle instructions may be executed back-to-back utilizing maximum processing efficiency. These and other objects of the present invention not specifically mentioned above will become clear within discussions of the present invention to follow.

SUMMARY OF THE INVENTION

A mechanism and method is disclosed providing an early read operation of data associated with an instruction dispatched for execution to provide data dependency information in time to be used for immediate scheduling subsequent (data dependent) instructions which may execute back-to-back in a pipeline microprocessor. The present invention provides the above functionality for single cycle instructions. The present invention provides immediate scheduling of instructions that are dependent on single cycle instructions. A reservation station holds the instructions that are to be scheduled for execution once their source data becomes available and when an execution unit is free. The early read logic is implemented so that a destination register address associated with a dispatched instruction can be read from the associated entry of the reservation station. The destination register address is read early enough so as to be used and compared against the addresses of source registers of other instructions waiting to be scheduled (a CAM match). In this way, a subsequent instruction can be made ready for scheduling within a single clock cycle following the dispatch stage of the previously dispatched instruction to achieve maximum throughput efficiency. The present invention utilizes a non-clocked read memory to perform the early read operation of the destination register address of the reservation station while the remainder of the reservation station utilizes a clocked-read implementation and memory.

Specifically, embodiments of the present invention include, within a memory array having individual entries containing information pertaining to individual instructions to be executed, a mechanism for supplying destination registers of scheduled instructions, the mechanism having: a clock for synchronizing instruction pipestages; a first memory array for supplying a destination register address of a scheduled instruction, wherein information supplied from the first memory array is not clocked (e.g. in coincidence) with transitions of the clock; and a second memory array for supplying other information pertaining to the scheduled instruction, wherein information supplied from the second memory array is in synchronization with the clock.

Embodiments of the present invention include the above and wherein the scheduled instruction is a single cycle instruction and wherein the first memory array is a static random access memory and the second memory array is static random access memory having a precharged output line. Embodiments of the present invention include the above wherein the scheduled instruction is scheduled during a schedule pipestage and wherein the first memory array further comprises read circuitry for supplying the address of the destination register of the scheduled instruction before the schedule pipestage ends. Embodiments of the present invention include the above and also wherein the read circuitry supplies the address of the destination register in time to allow a subsequent instruction to be scheduled in a pipestage immediately following said schedule pipestage of said scheduled instruction.

An embodiment of the present invention includes a method for supplying instruction information stored in a memory array wherein the memory array contains information pertaining to instructions to be executed, the method comprising the steps of: providing a clock for synchronizing instruction pipestages; scheduling a first instruction for execution during a pipestage of the instruction; supplying an address of a destination register of the first instruction from the memory array in response to the step of scheduling wherein the step of supplying the address of the destination register supplies the address of the destination register before the pipestage ends; and supplying other information pertaining to the first instruction, wherein the step of supplying other information supplies the other information clocked with transitions of the clock.

Embodiments of the present invention include the above and further having the steps of determining source availability for readying a subsequent instruction for scheduling, wherein the step of determining source availability occurs during a subsequent pipestage immediately following the pipestage of the first instruction; and wherein the step of supplying the address of the destination register supplies the address of the destination register to the step of determining source availability so that said subsequent instruction may be scheduled in a subsequent pipestage immediately following said pipestage of said first instruction.

The present invention also includes an improved microprocessor implemented with the embodiments as discussed above and further includes an improved computer system implemented with the improved microprocessor as described above.

BRIEF DESCRIPTION OF THE DRAWINGS

FIG. 2B illustrates the logical organization of the reorder buffer used by aspects of the present invention.

FIG. 3A is an illustration of the pipeline stages utilized by the present invention to execute a sample set of instructions which may be data dependent single cycle instructions.

FIG. 3B illustrates the pipeline stages utilized by the present invention to execute further sample instructions.

NOTATION AND NOMENCLATURE

Figure 1A:
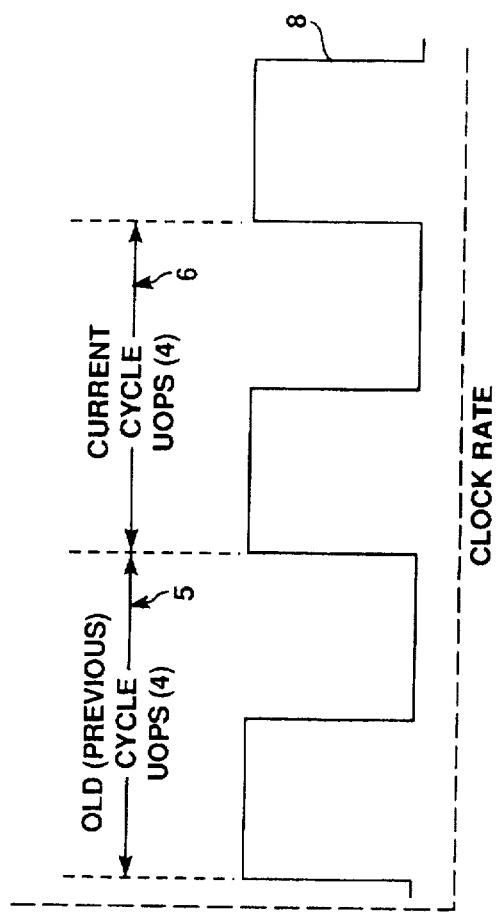
FIG. 1A illustrates the system clock of the present invention and that multiple instructions may be processed per clock cycle.

Within the discussions of the present invention, reference is made to "registers" within the reservation station. Specifically, "destination" and "source" registers are stored in the reservation station pertaining to instructions pending execution. It is appreciated that the above notation, as applied to the contents of the reservation station, refers to register addresses (or other register designation). The registers themselves exist in the reorder buffer or in the real register file. However, their designations (e.g., addresses) are stored in the reservation station. The term register "address" also includes an address tag or other type of register designation. Therefore, comparing a destination register PDST against registers in the reservation station means comparing an address of the destination register against the addresses of the source registers represented in the reservation station. Back to back scheduling refers to the process of immediate scheduling of instructions that are data dependent on single cycle instructions.

DETAILED DESCRIPTION OF THE INVENTION

OVERVIEW

Generally, a reservation station (storage array) is utilized to store information regarding instructions that are to be scheduled for execution when their source data are available (or alternatively, when the their source data is available and an execution unit is also available). Single cycle instructions are those that require only one clock cycle to perform their execution pipeline stage. The present invention allows maximum throughput for back-to-back (one after another at maximum processing throughput) execution of single cycle instructions that may be data dependent. In order to immediately schedule instructions dependent on single cycle instructions, the reservation station contains special CAM matching circuitry to check for data dependencies between the addresses of the destination and source registers pertaining to the instructions. However, in order to allow maximum throughput of instructions that follow a single cycle instruction in a pipeline processor, after a given single cycle instruction is ready and scheduled, the next instruction must be immediately (e.g., at the next clock cycle) determined to be ready and scheduled as well. In order to provide this required timing, the present invention provides two individual embodiments. The first is an early read embodiment and the second is the generation and use of next pointer vectors. Both embodiments will be discussed within the context of the reservation station environment.

The early read embodiment of the present invention includes an apparatus and method for providing a reservation station containing clocked and non-clocked read storage memory so that addresses of destination registers of dispatched instructions may be read early using a non-clocked storage memory and the results supplied in time to ready a subsequent instruction for scheduling within a single clock cycle. The non-clocked memory storage provides information not clocked (e.g. not in coincidence) with the transitions of the system clock. The present invention is able to provide back-to-back execution of data dependent instructions that follow single cycle instructions for maximum throughput efficiency. Also, the early read allows maximum execution of instructions that follow a single cycle instruction. Other ports of the reservation station are read utilizing clocked memory that supplies information in synchronization with the system clock. Although the non-clocked memory takes up more semiconductor space and is more complicated to fabricate, the decrease in read time is such that an additional clock cycle is not wasted during execution of single cycle instructions that may be data dependent.

The next pointer embodiment of the present invention includes an apparatus and method for generating two vectors for each instruction (one for each source) which indicates the instructions within the reservation station that will produce data used by that source. Therefore, if a given instruction is scheduled, the next pointer vector can be examined for that scheduled instruction to determine those instructions in the reservation station that should be scheduled next (assuming they are otherwise ready and valid). The present invention is able to provide back-to-back execution of single cycle instructions (that are data dependent) with maximum throughput efficiency. Also, next pointer vectors allow high efficiency execution of instructions that follow a single cycle instruction. In the present invention, the next pointers are generated in the register alias table and used in the reservation station. The next pointers are generated in the register alias table only because the register alias table has existing logic that already performs much of the required logic needed for the next pointer generation. However, it is appreciated that the next pointers may be generated in any logical unit that performs the required functions as described herein.

In the following detailed description of the present invention numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Refer to FIG. 1A which illustrates two clock cycles 8 used by the microprocessor of the present invention. Embodiments of the present invention may be implemented within a superscalar microprocessor of the present invention that may issue three or four instructions in parallel and dispatch and execute up to five instructions in parallel. However, the number of instructions capable of being processed in parallel is exemplary and aspects of the present invention are applicable to superscalar microprocessors that can execute a variety of numbers of instructions in parallel (e.g., 2, 3, 4, 5, etc.). As shown in FIG. 1A, within period 5 (the old cycle) three or four instructions are processed as a set. Regarding terminology, these are referred to herein as the previous cycle uops ("micro-operations" or "instructions") or the previous cycle set of uops. The subsequent set of uops, e.g., in period 6, are called the current cycle uops and belong to the current set.

EXEMPLARY PROCESSOR

Figure 1B:
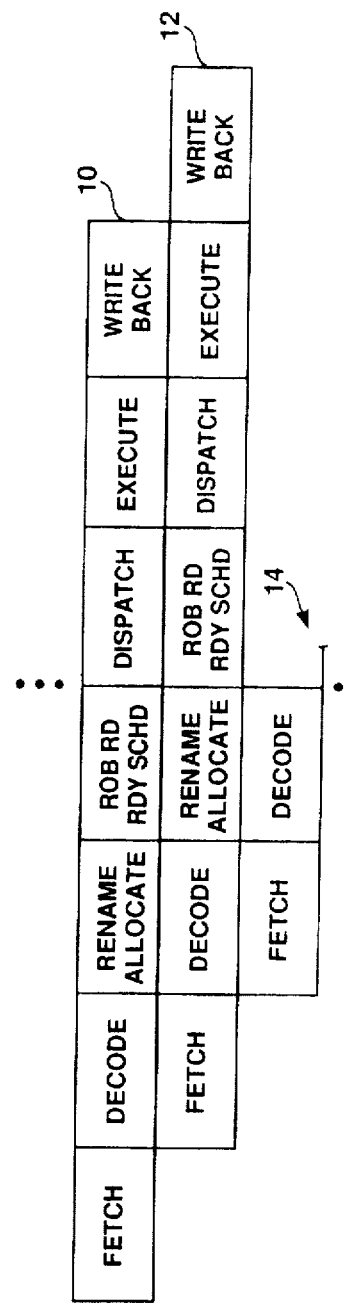
FIG. 1B illustrates an exemplary and general pipeline structure that may be adopted within the microprocessor of the present invention.

The microprocessor 1101 of the present invention is implemented to perform either the early read embodiment or the next pointer embodiment and is a pipelined processor. The processor may also be superscalar. FIG. 1B illustrates exemplary pipestages that may be utilized by the pipeline processor. The full pipeline stages 10, 12 for two instructions are illustrated. Each instruction is divided into an instruction FETCH stage, an instruction DECODE stage, a RENAME stage wherein registers may be renamed to eliminate false data dependencies, and a READY/SCHEDULE stage wherein a reorder buffer is read for data and also instructions within a reservation station are readied for scheduling and scheduled for execution. Next, a DISPATCH stage is entered where an instruction that is scheduled by the reservation station is dispatched for execution. An EXECUTE stage is entered where a dispatched instruction is processed by an available execution unit.

It is appreciated that depending on the instruction, several execution stages may be required to fully execute the instruction. Instructions that require only one execution stage (e.g., an add or subtract instruction) are called "single cycle" instructions. After execution, an instruction enters a WRITE BACK stage where the data generated from the execution stage is written back into a register file that may not be architecturally visible. It is appreciated that the results of speculative instruction execution, as a result of branch prediction logic, are updated to an architecturally visible register file only if it is indicated that their branch was properly predicted, otherwise they are written back into a reorder buffer that is not architecturally visible.

As shown in FIG. 1B, for the DECODE pipeline stage of pipeline 10 is processed by the microprocessor simultaneously with the FETCH stage of pipeline 12. In operation, the fetch, decode, execute, and write back stages concurrently process different instructions. At each clock cycle the results of each processing stage are passed to the following processing stage. The RENAME, READY/SCHEDULE, DISPATCH, and EXECUTE stages will be more fully discussed below.

It is appreciated that the principles of the present invention are applicable to many varieties of pipelined microprocessors that may utilize different pipeline stages. The particular stages illustrated in FIG. 1B are exemplary only and are illustrated in order to describe aspects of the present invention. For instance, within the present invention, the execute and write back stages occur within different phases of the same clock cycle and are followed by a retirement stage. Further, the DISPATCH stage is followed by a potential BYPASS stage and both DISPATCH and BYPASS occur during different phases of the same clock cycle (see FIG. 3A).

Figure 2A:
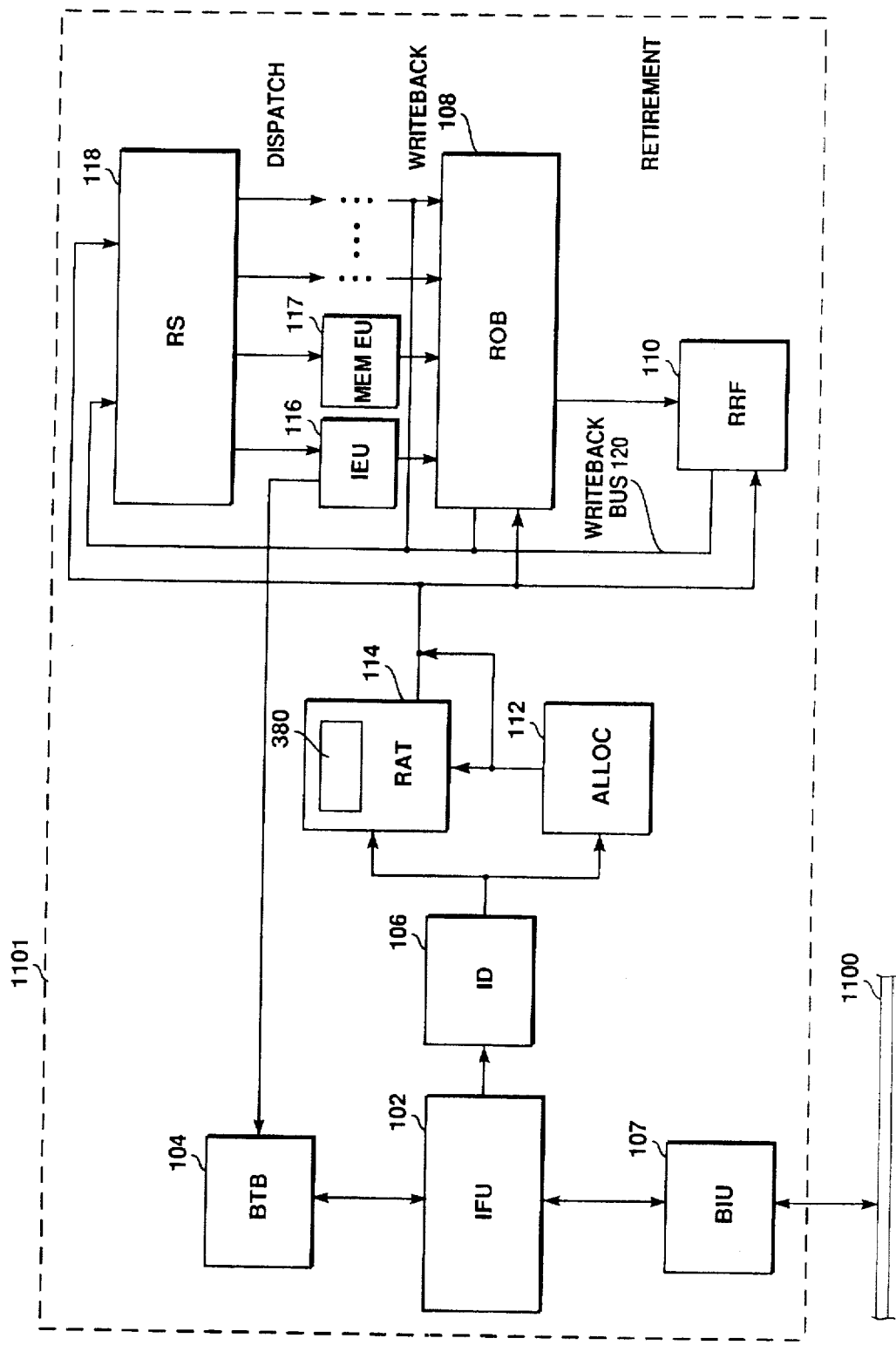
FIG. 2A illustrates a block diagram form of the microprocessor of the present invention.

FIG. 2A is a block diagram of an embodiment of a pipeline processor 1101 that embodies either the early read embodiment and the next pointer embodiment of the present invention. The next pointer embodiment includes a next pointer vector generation block 380 within the RAT 114 and also includes logic to interface the next pointer buffers to the ready determination logic of the reservation station 118. The early read embodiment of the present invention requires a special reservation memory storage (using both clocked and non-clocked memory) within unit 118. The processor 1101 comprises an instruction fetch unit (IFU) 102 coupled to a branch target buffer (BTB) 104 and an instruction decoder (ID) 106. The BTB utilizes a branch prediction mechanism that predicts the outcome of program branches, and then fetches subsequent instructions according to the branch prediction. Branch prediction is achieved, in part, by storing the history of a branch instruction based only upon the instruction pointer or address of that instruction. Every time a branch instruction is fetched, the BTB predicts the target address of the branch using the branch history. For a more detailed discussion of branch prediction, please refer to Tse Yu Yeh and Yale and Patt, *Two-Level Adaptive Branch Prediction*, the 24th ACM/IEEE International Symposium and Workshop on MicroArchitecture, November 1991, and Tse Yu Yeh and Yale N. Patt, *Alternative Implementations of Two-Level Adaptive Branch Prediction*, Proceedings of the Nineteenth International Symposium on Computer Architecture, May 1992. The present invention may also be implemented in a microprocessor that does not perform speculative execution.

It is appreciated that for microprocessors that speculatively execute instructions, the pipeline stages of FIG. 1B will include an additional stage called RETIREMENT wherein data resulting from the WRITE BACK stage is written into the architecturally visible register file only when the instruction is determined to be part of a properly predicted program branch. However, it is appreciated that the embodiments of the present invention may also function within a pipeline microprocessor that does not speculatively execute instructions. To this extent the BTB and related logic is optional.

Referring to FIG. 2A, based upon the instruction pointer IP) provided by the BTB 104 to the IFU 102, the IFU 102 fetches the instruction found at the address in memory (not shown) that is indicated by the IP. The instruction is decoded into one or more uops by the instruction decoder 106. Such a decoding mechanism is found in the Intel and similar microprocessor architectures. The instruction decoder 106 transfers the stream of uops to a register alias table (RAT) 114 and an allocator (ALLOC) 112. In one embodiment, the instruction decoder 106 issues up to four in-order uops during each cycle of the processor.

The RAT 114 renames the logical source and destination registers specified by a received uop to correspond to physical sources and destinations. The physical sources specify physical registers contained in a reorder buffer (ROB) 108 and committed state registers contained in a real register file (RRF) 110 (which is the architecturally visible buffer). Each physical destination represents an entry of the ROB 108 or RRF 110 and is denoted by the symbol "PDST". The mapping of a logical destination (specified by an instruction) to a PDST entry is maintained in the register alias table 114. The RAT 114 also stores as part of the PDST a real register file valid bit (RRFV) which indicates whether the value indicated by the logical destination is to be found at the PDST in the ROB 108 or in the actual architectural register in the real register file 110 after retirement. In addition, the RAT 114 contains the circuitry 380 required to generate the next pointer vectors of the present invention which will be discussed to follow.

Processor 1101 also contains a reservation station 118 for containing information related to instructions that have been fetched, decoded, and renamed and are being queued for dispatch and execution until their source data is ready (alternatively, also when an execution unit becomes available) and until a scheduler determines the proper and efficient execution sequence. The reservation station 118 couples to supply information to and receive information from the execution units 116 and 117, and other execution units not shown. The next pointer embodiment and the early read embodiment of the present invention both offer mechanisms to provide data dependency information quickly so that data dependent instructions may be executed back-to-back at maximum processing throughput. A bus interface unit (BIU) 107 is coupled to a system address/data bus 1100 and also coupled to the instruction fetch unit (IFU) 102. The BIU 107 interfaces to supply data to and from the computer system bus 1100.

It is appreciated that the microprocessor 1101 of FIG. 2A (of the Intel architecture) is exemplary only and that the present invention may be applied to a variety of microprocessor designs, such as, the Alpha architecture and PowerPC architecture for instance. Further, the microprocessor 1101 may be implemented on a single chip or on a variety of chips and may be implemented using silicon or gallium arsinide substrates. Although the exemplary processor 1101 allows speculative execution and is superscalar, aspects of the present invention operate effectively within pipeline processors that do not perform speculative execution nor are superscalar.

EXEMPLARY PROCESSOR OPERATION

In combination with speculative execution, instructions within the microprocessor 1101 of FIG. 2A may be dispatched out-of-order (e.g., out of program order) to the execution units. With out-of-order completion, any number of instructions are allowed to be in execution in the execution units, up to the total number of pipeline stages in all the functional units. Instructions may complete out of order because instruction dispatch is not stalled when a functional unit takes more than one cycle to compute a result. Consequently, a functional unit may complete an instruction after subsequent instructions have already completed For a detailed explanation of speculative out-of-order execution, reference is made to M. Johnson, *Superscalar Microprocessor Design*, Prentice Hall, 1991, Chapters 2, 3, 4, and 7.

Instruction dispatch is stalled when there is a conflict for a functional unit or when an issued instruction depends on a result that is not yet computed. In order to prevent or mitigate stalls in decoding, the reservation station 118 is provided between the decode and execute stages. The processor decodes instructions and places them into the reservation station as long as there is room in the buffer, and at the same time, examines instructions in the reservation station to find those that can be dispatched to the execution units (that is, instructions for which all source operands and the appropriate execution units are available). Instructions are dispatched from the reservation station with little regard for their original program order. However, the capability to issue instructions out-of-order introduces a constraint on register usage. To understand this problem, consider the following instruction sequence:

1. t←load (memory)
2. eax←add (eax,t)
3. ebx←add (ebx, eax)
4. eax←mov (2)
5. edx←add (eax, 3)

The micro-instructions and registers shown above are those of the well known Intel microprocessor architecture. For further information, reference may be made to the *i486™ Microprocessor Programmers Reference Manual*, published by Osborne-McGraw-Hill, 1990, which is also available directly from Intel Corporation of Santa Clara, Calif.

In an out-of-order processor executing these instructions, it is likely that the processor would complete execution of the fourth instruction before the second instruction, because the third add instruction requires only one clock cycle, while the load instruction and the immediately following add instruction requires a total of four clock cycles in the Intel architecture for the present implementation. However, if the fourth instruction is executed before the second instruction, then the fourth instruction would probably incorrectly overwrite the first operand of the second instruction, leading to an incorrect result. Instead of the second instruction producing a value that the third instruction would use, the third instruction produces a value that would destroy a value that the second one uses.

This type of dependency is called a storage conflict, because the reuse of storage locations (including registers) causes instructions to interfere with one another, even though the conflicting instructions are otherwise independent. Such storage conflicts constrain instruction dispatch and reduce performance.

Storage conflicts can be avoided by providing additional registers that are used to reestablish the correspondence between registers and values. Using register renaming (via the RAT 114), the additional registers are associated with the original logical registers and values needed by the program. To implement register renaming, the processor typically allocates a new register for every new value produced, e.g., for every instruction that writes a register. An instruction identifying the original logical register for the purpose of reading its value obtains instead the value in the newly allocated register. Thus, the RAT 114 renames the original register identifier in the instruction to identify the new register and the correct value. The same register identifier in several different instructions may access different hardware registers depending on the locations of register references with respect to the register assignments.

With register renaming, the example instruction sequence depicted above becomes:

1. $t_a$←load (mem)
2. $eax_b$←add (eaxa,ta)
3. $ebx_b$←add (ebxa,eaxb)
4. $eax_c$←mov (2)
5. $edx_a$←add ($eax_c$,3)

In this sequence, each assignment to a register creates a new instance of the register, denoted by an alphabetic subscript. The creation of a renamed register for eax in the fourth instruction avoids the resource dependency on the second and third instructions, and does not interfere with correctly supplying an operand to the fifth instruction. Renaming allows the fourth instruction to be dispatched immediately, whereas, without renaming, the instruction must be delayed until execution of the second and third instructions. When an instruction is decoded, its result value is assigned a location in the functional unit called a reorder buffer (ROB) 108 of FIG. 2A, and its destination register number is associated with this location. This renames the destination register to the reorder buffer location. When a subsequent instruction refers to the renamed destination register, in order to obtain the value considered to be stored in the register the instruction may instead obtain the value stored in the reorder buffer 108 if that value has already been computed.

The logical registers specified by the decoded instruction are assigned locations in the ROB 108 by the RAT 114 which keeps track of such assignments. The use of register renaming in the ROB 108 not only avoids register resource dependencies to permit out-of-order execution, but also plays a key role in speculative execution. If the instruction sequence given above is considered to be part of a predicted branch, then one can see that execution of those instructions using the renamed registers in the ROB has no effect on the actual registers denoted by instruction. Thus, if it is determined that the branch was mispredicted, the results calculated and stored in the ROB may be erased and the pipeline flushed without affecting the actual registers found in the processor's retirement register file (RRF) 110. If the predicted branch affected the values in the RRF, then it would be impossible to recover from branch misprediction because it would be impossible to determine the values stored in the registers before the predicted branch was taken without the use of redundant registers in the ROB.

When a result is produced, it is written to the ROB 108. The result may provide an input operand to one or more waiting instructions buffered in the reservation station, indicating that the source operand is ready for dispatch to one or more execution units along with the instructions using the operand. When dependent instructions are pipelined, the process of waiting for the result data to be written back from an execution unit in order to determine the availability of a source operand adds latency to the system, thereby limiting instruction throughput. Thus, it is desired to find a means for increasing the throughput of dependent instructions in an out-of-order processor.

RESERVATION STATION

Figure 4:
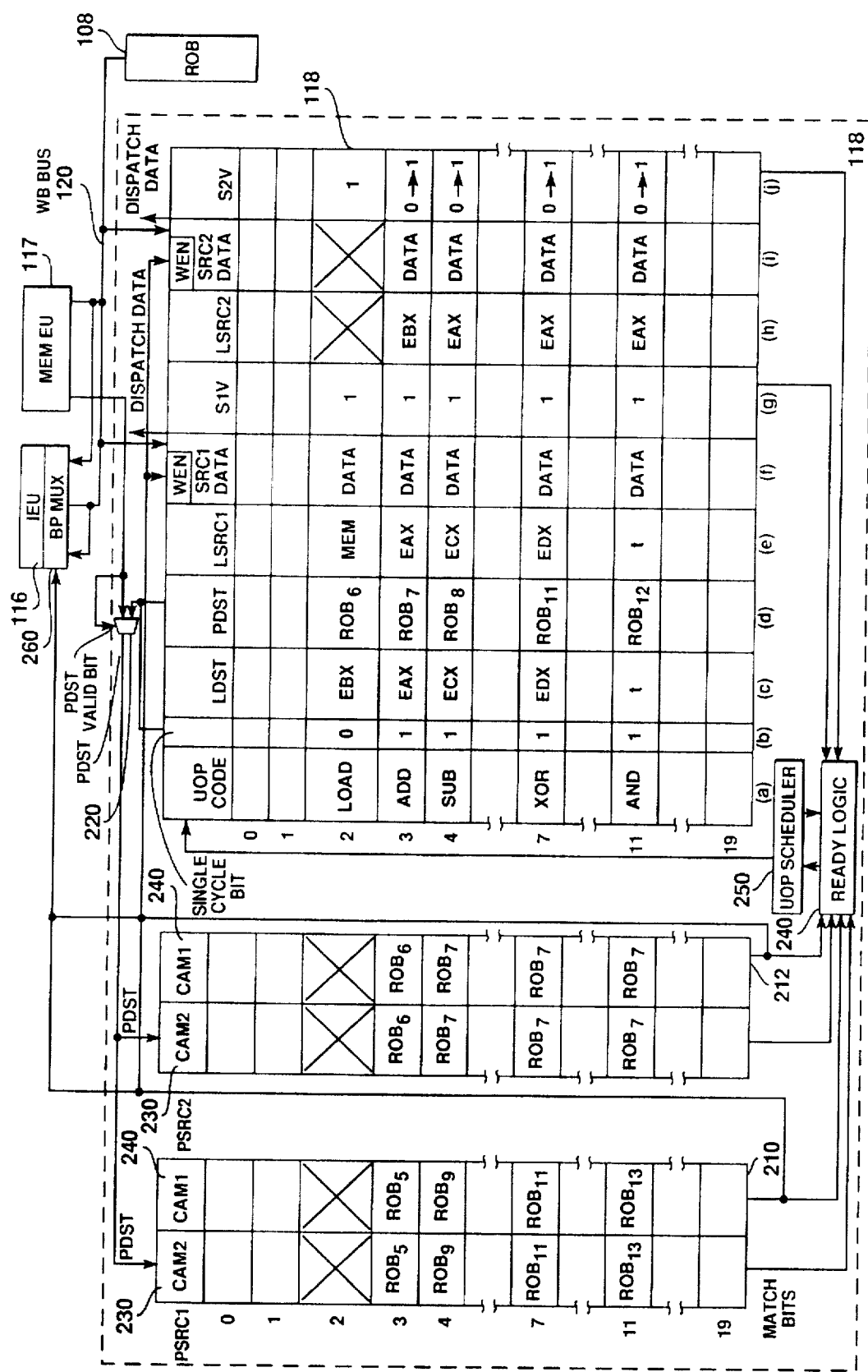
FIG. 4 is a logical diagram of the reservation station and the early read embodiment of the present invention.

Each incoming uop is assigned and written into an entry in the reservation station 118 by the allocator 112. The reservation station 118 is used in the READY/SCHEDULE/DISPATCH stages of the above pipeline format By containing the source data of instructions the reservation station is involved in the determination if an instruction is ready to be scheduled. Once ready, the reservation station (via ready logic) informs the schedulers which then schedule the ready instruction for a given execution unit. Once scheduled, the reservation station 118 dispatches the instruction by supplying the requisite data to the execution units. As shown in FIG. 4, a reservation station (RS) 118 contains the information required for executing instructions that are pending execution by an appropriate execution unit, such as integer execution unit (IEU) 116 or memory execution unit (MEM EU) 117.

For purposes of illustration, entries 2, 3, 4, 7 and 11 of the RS 118 buffer the micro operations (uops) of the following instruction sequence:

| macro op | uop |
|---|---|
| LOAD (ebx,mem) | ebx ← load(mem) |
| ADD (eax,ebx) | eax ← add(eax,ebx) |
| SUB (ecx,eax) | ecx ← sub(ecx,eax) |
| XOR (edx,eax) | edx ← xor(edx,eax) |
| AND (t,eax) | t ← and(t,eax) |

In one embodiment this instruction sequence is fetched from an instruction cache (not shown) by the IFU 102 according to predicted instruction pointers from the BTB 104. As an example, the ADD macro instruction is decoded by the instruction decoder 106 into the micro operation eax←add(eax,ebx) in the Intel microprocessor architecture.

FIG. 2B illustrates a table in the ROB 108 showing the mapping of the logical registers specified by the instruction sequence to physical registers in the ROB. The length of the ROB 108 may be variable and in FIG. 2B there are 14 entries ($ROB_0$–$ROB_{13}$). In this example, the first logical source eax register (LSRC1 in FIG. 4) of the add instruction, which must contain the result of a prior instruction, is mapped by the RAT 114 to the physical destination (PDST) of that prior instruction at ROB entry PDST=$ROB_5$. Because the logical source register (LSRC1) of the add instruction is the same as the logical destination (LDST) of the prior instruction, LSRC1 is mapped to a first physical source register (PSRC1) at the same ROB entry PDST-$ROB_5$. Similarly, the second logical source register ebx (LSRC2), which also must contain the result of a prior instruction, is mapped to a second physical source register (PSRC2) at ROB entry PDST=$ROB_6$. The logical destination register (LDST) of the add instruction, also designated by the logical register eax, is mapped to a physical destination register (PDST) at ROB entry PDST=$ROB_7$. Similarly, the other instructions have their logical sources and destinations mapped to physical register identifiers in the ROB 108 by the RAT 114, and their corresponding uops are written into the entries of the reservation station 118. For reasons described below, the physical source registers PSRC1 and PSRC2 are stored as tags in CAM matching circuitry 210 and 212 for the first and second source operands, respectively.

It is appreciated that the LDST column (c), the LSRC1 column (e), and the LSRC2 column (h) are not actually a physical part of the reservation station table 118. Rather, they are shown in an effort to illustrate the relationship between the logical registers of the instructions as decoded and the physical registers (PDSTs) within the ROB 108. The information regarding the logical destinations and logical sources is stored and made available by the register alias table 114 which assigns allocated PDSTS to the logical destination registers of a current set of decoded instructions.

In the example, note that the add instruction depends upon the result of the load instruction in that the second source operand of the add instruction is stored in the same logical register (ebx) as the result of the load instruction. Similarly, the subtract, exclusive OR (XOR) and AND instructions are dependent upon the ADD instruction in that the ADD instruction writes its results to the eax register, which is the second source operand of those three dependent instructions. For purposes of this example, the ecx, edx and t (temporary) source operand registers are assumed to hold valid data as a result of the execution of previous operations (not shown).

After the logical sources and destinations of a uop have been mapped to physical sources and destinations, and the uop stored at an available entry in the reservation station 118 by the allocator 112, the instruction is scheduled for dispatch and executed according to the pipeline stages illustrated in FIG. 3A. In one embodiment, the pipe stages are divided according to processor clock cycles, with the solid vertical lines representing a rising clock edge and the dashed vertical lines representing a falling clock edge.

In general, during the READY pipestage, the reservation station 118 determines whether the source operands for a instruction are available and whether the execution unit for executing that instruction is also available. If ready, then the instruction enters the SCHEDULE pipestage in which the reservation station determines whether multiple uops need to be dispatched for execution by the same execution unit, and, if so, arbitrating among such uops to determine the order in which they are to be dispatched. During the DISPATCH pipestage, the scheduled uop is read from its entry in the reservation station by the scheduled execution unit. As will be described in more detail below, after the dispatch of a uop, a POTENTIAL BYPASS pipestage is made available in which result data needed by the uop may be bypassed directly from the execution unit executing a previous instruction to the execution unit executing the current uop. This avoids the necessity of writing the result data to the reservation station 118 or the ROB 108 and then reading the data out as a source operand of the currently executing uop, thus increasing instruction throughput.

During the EXECUTION UNIT and WRITE BACK stages, a uop may then be executed by the scheduled functional unit, and the result data written back from the execution unit into its corresponding ROB entry and into entries of the reservation station 118 that holds uops requiring the result data as a source operand. In addition, as mentioned above, the result data may be internally bypassed to an execution unit requiring the result data. It should be understood that the reservation station pipeline stages that are illustrated in FIG. 3A are but one means of processing an instruction according to the present invention. The present invention is not limited to a processor implementing the pipestages of FIG. 3A, but is applicable to any pipeline microprocessor.

As illustrated in FIG. 3B, the present invention enables the pipeline stages of instructions to be overlapped "back-to-back" in such a way as to achieve maximum execution throughput of the instructions. Back-to-back describes immediate scheduling of instructions that are dependent on single cycle instructions. In processors using the pipestages of FIG. 3A, such back-to-back scheduling results in a one cycle throughput. In this example, FIG. 3B illustrates the back-to-back pipelining of the instructions of the exemplary instruction sequence described above. One cycle throughput refers to the case as shown in FIG. 3B where the SUB instruction is executed taking only one clock cycle longer than the previous ADD instruction. This can only be accomplished if the SUB instruction is scheduled within one clock cycle succeeding the schedule pipestage of the ADD instruction. This is accomplished within the present invention. Therefore, use of the early read circuit and the ready logic 240 (of FIG. 4) allow the SUB instruction, which is data dependent on the ADD instruction, to be scheduled within a scheduled pipestage that succeeds the scheduled pipestage of the ADD instruction by one clock cycle. This is also referred to as maximum throughput efficiency because it allows the SUB to be executed with single cycle throughput.

In FIG. 3B, the load instruction passes through the READY and SCHEDULE stages, and then is dispatched to the memory execution unit 117. Upon dispatch, the data within the reservation station for the dispatched instruction becomes invalid. This is true because after dispatch the reservation station entry should be free to receive new instruction information for subsequent operations for maximum use of the reservation station resources. In the current implementation of the Intel microprocessor architecture, the execution of a load instruction takes three clock cycles. After execution, the result data, which is to be stored at the logical source register ebx and the corresponding physical destination register $ROB_6$, is placed on a write back bus 120 so that it may be written into the appropriate PDST entry of the ROB. The result of the load instruction also provides a source operand for the subsequent add instruction.

According to the present invention, the memory execution unit 117 provides the PDST of the result two cycles before writing back the result data. This feature is used both to allow the dependent add instruction to be scheduled for dispatch early, and to allow for the bypassing of the result data. The PDST of an instruction may not be retrieved from the RS table 118 after dispatch of that instruction. With respect to scheduling, the PDST from the memory execution unit 117 is fed through PDST multiplexer 220 into two-cycle CAM matching circuitry 230 (CAM2), which stores the first and second physical source operand tags PSRC1 and PSRC2. The incoming PDST is associatively matched with these source operand tags in the CAM2 arrays. It is appreciated that the two cycle CAM matching circuitry (CAM2) is analogous to the one cycle CAM matching circuitry (CAM1) but the CAM2 operates on PDSTs supplied two cycles before write back while CAM1 operates on PDSTs supplied one cycle before write back. PDSTs from CAM2 are latched and supplied to CAM1. Both operate simultaneously. There are well known methods and circuits for performing CAM (Content Addressable Memory) matching of an array of CAM cells against an input data register. Any number of these well known methods may be utilized within the scope of the present invention.

In this example, the PDST ROB6 results in a match at entry 3 of the second source operand PSRC2 CAM2 array, indicating that the second source operand of the add instruction will soon become available on the writeback bus 120 from an execution unit. The resulting CAM match bit for entry 3 of the second source operand CAM2 array is fed into a ready logic circuit 240. As mentioned above, in this example the first source operand (corresponding to eax and located at $ROB_5$) of the add instruction is assumed to be available. This latter condition results in a source valid bit (S1V) for the first source operand of that instruction being set to 1 in the reservation station 118. This source valid bit is also fed into the ready logic circuit 240. Using this information, the ready logic circuit 240 determines that a source operand is ready for scheduling and for dispatch to the appropriate execution unit along with the corresponding instruction when the following logical equation is satisfied:

source ready=[(source valid bit) OR (CAM2 match bit) OR (CAM1 match bit)] AND RS Entry Valid To be ready, both of an instruction's source data must be available (valid or via CAM match), and the entry of the reservation station corresponding to the instruction must be valid (e.g., there must be an instruction present in the entry to be valid). Alternatively, the source ready determination may be dependent on an execution resource being available. To be scheduled for execution, a ready entry must have a corresponding execution unit available and be in line for execution. The execution unit capable of executing the instruction is specified by the opcode. It is appreciated that the scheduler 250 maintains which execution units 117 are available for use.

It is appreciated that, for a given clock cycle, an instruction's ready logic must continue to be valid in order for the instruction to remain ready. That is, it is possible for an instruction to be ready based on differing criteria across different clock cycles. In other words, it is possible for an instruction to be ready based on a CAM2 match for a given source, then on a second cycle it is ready based on a CAM1 match for the same source and then on two subsequent cycles it can be ready based on valid data for both sources. Then on a subsequent cycle, the instruction is dispatched for execution.

In this example, both the first source valid bit and the second source CAM2 match bit have been set. Consequently, the ready logic circuit 240 determines that the add instruction entry will soon have both of its source operands available so that the instruction may be dispatched if the integer execution unit 116 is also available. The ready logic circuit 240 signals a scheduler circuit 250 that entry 3 is ready. In response to this signal, the scheduler circuit 250 will schedule the add instruction for dispatch to the integer execution unit 116.

During the writing of the PDST by the memory execution unit 117, the PDST is latched in the CAM circuitry (latch not shown) and used by 1-cycle CAM matching circuitry (CAM1) 240 during the POTENTIAL BYPASS stage. The latched PDST is associatively matched with the first and second source operand tags (PSRC1 and PSRC2) that are stored in the CAM1 240 arrays. The CAM1 match again results in a match for the second source operand (PSRC2) of entry 3. Note that the POTENTIAL BYPASS (BP) stage of the add instruction is timed to coincide with the writing back of data from the load instruction. The match bit resulting from the second source CAM1 match is used to control an EU bypass multiplexer 260 in the integer execution unit 116. In response to the CAM1 240 match bit, the EU bypass multiplexer 260 routes the result data directly from the memory execution unit 117 to a source operand input of the integer execution unit 116. Thus, upon receiving the dispatched add instruction, the integer execution 116 unit has all its source operands immediately available.

As shown in FIG. 4, the CAM1 240 match bits are also fed into write enable inputs of the RS 118 to enable the write back of result data to the appropriate source data fields in the reservation station entries for which the PDST of the write back data resulted in a match.

The foregoing discussion illustrates how the add instruction is made ready for dispatch and thereafter dispatched with all its source operands valid. The determination of the readiness of the operations dependent upon the add instruction will now be discussed. As mentioned above, the execution unit executing a dispatched instruction provides the PDST two cycles before writing back the result data. The PDST is then used to determine the readiness of instructions that depend upon the data to be written back. However, this mechanism results in an undesired latency that limits instruction throughput when the instruction writing back the data is a single cycle uop, i.e., the execution/write back stage occurs in a single processor cycle. Here, the add instruction is a single cycle uop that is writing back data with a PDST=ROB7, which represents the logical destination register eax. It is desired to achieve back-to-back scheduling of single cycle uops, such as the add instruction, and their dependent instructions (such as the subtract instruction). This requires that at least one dependent instruction implement its ready pipestage at the same time that the add instruction is being dispatched.

However, given our discussion above, the PDST (ROB$_7$) for the ADD instruction is not returned until two cycles before the write back. But in this case for the ADD instruction (as shown in FIG. 3A), two cycles before write back happens to occur before the add instruction is even dispatched. It is impossible for the execution unit 116 to write back the PDST for the ADD instruction before the ADD instruction is even dispatched. This is the case because it is the act of dispatch that informs the execution unit of the PDST (ROB$_7$) in the first place. Therefore, the present invention utilizes an alternate way to provide the PDST to the CAM2 and CAM1 matching logic. This alternate way is to read the PDST for the ADD instruction directly from the RS 118 before the ADD instruction is dispatched. This is called the early read embodiment of the present invention.

The present invention provides a mechanism for the early reading of the PDST of a dispatching single cycle instruction (the early read embodiment) so that the PDST may be read upon the assertion of the schedule line of the dispatching instruction and supplied before the instruction is actually dispatched. The details of this early read operation will be discussed in detail further below. The PDST is written into the RS 118 during allocation of the uop to the RS 118. Thus, in this example, after the add instruction has been determined to be ready, it is already known that the PDST in the add reservation station entry represents the PDST of data that will be written back after execution of the add instruction. Accordingly, the present invention provides the PDST bypass multiplexer 220 with the PDST from the add uop reservation station entry, and from the multiplexer 220 this PDST is supplied directly to the CAM2 230 match circuitry of the first and second source operands, thereby bypassing the round trip of the PDST from the third reservation station entry to the IEU 116 and back again. From the CAM2 230 circuitry, the PDST is latched into the CAM1 circuitry 240. It is important to realize that the PDST for the ADD is supplied (according to the present invention) in advance of the dispatch cycle of the ADD instruction (see further the discussion with respect to FIG. 6).

To reiterate, the multiplexer 220 provides the PDST directly from the RS 118 (via the early read embodiment), and not from an execution unit, when a single cycle uop is to be dispatched. The multiplexing function of the multiplexer 220 may be controlled through a number of methods. First, only those execution units that execute multiple cycle uops are configured to transfer a PDST Valid bit (PDSTV) along with the PDST two cycles before write back.

As shown in FIG. 4, the PDSTV bit acts as the input selector control of the PDST bypass multiplexer 220. If the PDSTV bit is set (representing a multicycle uop), then the PDST issued by the execution unit is routed to the CAM2 230 circuitry. The PDSTV bit is transferred along with the PDST itself to the CAM2 230 in order to enable and initiate the CAM matching process. If the PDSTV bit is not set (representing a single cycle uop), then the PDST from the add uop instruction entry of the RS 118 is routed by the multiplexer 220 to the CAM2 230 circuitry, thus bypassing the round-trip of the PDST through an execution unit. The multiplexer 220 also routes a "single cycle bit" from the RS 118. The single cycle bit, like the PDSTV bit, is used to enable and initiate CAM matching. The single cycle bit is provided as part of the uop opcode during the process of decoding a macro instruction into single cycle uops. An alternative method (not shown) of controlling the PDST bypass multiplexer 220 uses the single cycle bit alone as the multiplexer input selector control.

In this example, the bypassed PDST of the add instruction is fed into the CAM2 230 circuitry to identify dependent instructions. The CAM2 match of the PDST=ROB$_7$ results in matches for the second source operand of entries 4, 7 and 11. The match bit at those entries for the second source operand, along with the already set source 1 valid (S1V) bits for those entries indicates that the subtract, XOR and AND operations are ready for dispatch as soon as execution units are available to execute those functions.

Ideally, if different execution units were provided for each operation, all three dependent operations could be dispatched simultaneously. However, in an alternative embodiment, the subtract function and the logical XOR and AND functions may only be executed by the same execution unit, e.g., the integer execution unit 116. Thus, all three operations cannot be dispatched to the IEU 116 at the same time, but rather must be scheduled for dispatch one after the other. The scheduler 250 selects the order of dispatch according to any of a number of algorithms. The three dependent instructions may, for example, be scheduled randomly or in a first-in-first-out (FIFO) order, or some variation thereof. In this example, the scheduler 250 selects the micro operations to be dispatched in first-in-first-out order as shown in FIG. 3B. Because the subtract function is followed by the exclusive OR and logical AND functions, respectively, in the in-order program code, those instructions were issued to the reservation station in that order (from oldest to youngest). Thus, based on the FIFO algorithm scheduling, the subtract uop is dispatched first. The scheduler 250 will be discussed in more detail further below.

As before, the PDST has been latched, and is used by the CAM1 circuitry 240 to control the EU bypass multiplexer 260 of the IFU 116 and the write enables of the reservation station source data entries. The match bit from the second source operand CAM1 240 implements an internal bypass of the result data from the execution of the add instruction in the IEU 116 back to the same IEU 116 for use as the second source operand for execution of the subtract instruction in the IEU 116.

In this case, because the PDST of the add instruction also resulted in CAM1 matches for entries 7 and 11, the result data from the add instruction is written into the second source data fields (SRC2 DATA) of the exclusive OR and logical AND operations, the write enables for those fields having been asserted by the match bit from second source operand CAM1 240.

As stated before, the CAM1 match performed during dispatch of the subtract operation can be used to determine again the readiness of instructions for dispatch. This obviates the need to provide storage for the previously determined ready state which may have been based on the results of a CAM2 match. The CAM1 match determines that the XOR and AND operations are ready. The CAM1 match bit for the subtract instruction is not used to determine again the readiness of that instruction because that would result in multiple dispatches of the subtract instruction. Thus, although the subtract operation uses the CAM1 match bit for controlling the EU bypass multiplexer 260 and the write enables of the RS 118 entries, the ready logic for the entry containing the subtract operation is disabled by the scheduler 250 after scheduling that instruction for dispatch. In general, the ready logic for any instruction entry is disabled after it has been scheduled to prevent multiple dispatches of the same instruction. This is performed by resetting a entry valid bit which is fed to the ready logic 240 for each entry of the RS 118.

After the XOR and AND operations have been found ready, the scheduler 250 arbitrates between the two instructions and selects the XOR entry for dispatch according to the FIFO algorithm used in this example. The XOR entry is then dispatched Because the result data WRITE BACK stage of the add uop coincides with the SCHEDULE stage of the XOR uop, the result data is already stored in the XOR SRC2 DATA by the entry at this time the XOR uop is dispatched, thereby providing the source operand data to the IEU 116. Because the previous result data is available from the RS entry, the EU bypass multiplexer 260 is disabled after the result data has been written into the RS in order to prevent bypassing.

Moreover, during the write back of the result data after execution of the add instruction, along with the result data that is written into entries of the reservation station 118, corresponding source valid bits are set in those entries. During write back, the data from the execution unit 116 is written to the RS table 118 as well as to the ROB 108 via the write back bus 120 as shown in FIG. 4. All subsequent instructions, e.g., the logical AND instruction, then use the source valid bits, which are fed into the ready logic 240, to determine whether a source operand is ready for dispatch.

Figure 5:
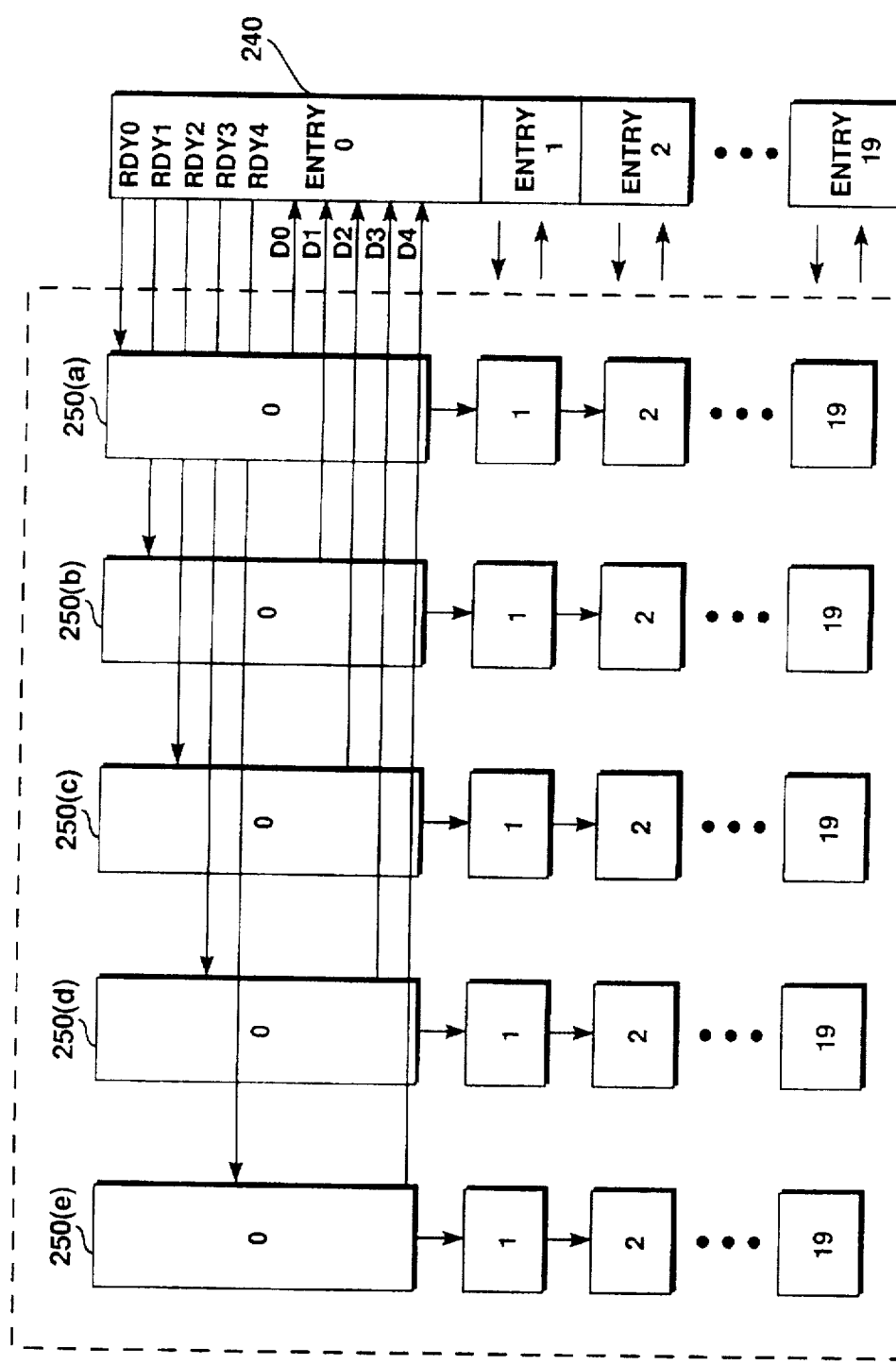
FIG. 5 illustrates the schedulers of the present invention and the interface with the ready logic of the reservation station.

Refer to FIG. 5 which illustrates in more detail the scheduler 250 to ready logic 240 interface of the present invention (of FIG. 4). The present invention includes a separate scheduler (250(a)–250(e)) for each execution unit of the present invention. As shown in FIG. 2A there is an integer execution 116 and a memory execution 117 and others within processor 1101. The processor 1101 contains five execution units in total (some for performing integer, floating point and other computations) and each execution unit has an associated scheduler.

As shown in FIG. 5, a particular entry (e.g., instruction) of the reservation station 118 may become ready to be scheduled on any one of the schedulers because a given instruction may execute on any given and available execution unit. Therefore, each entry of the reservation station transmits a separate ready line to each individual scheduler (250(a)–250(e)). The ready line generation for entry 0 of the reservation station is shown for all five schedule lines (RDY0–RDY4). Although any given instruction may utilize any of the five execution units, specific instructions are limited to certain execution units. Therefore, the purpose of the ready lines, for each entry, is to inform the schedulers to what possible execution units a given instruction can be dispatched. It is appreciated that each of the 20 entries of the reservation station generate five ready signals. It is possible that two or more ready signals, for a given entry, can be asserted assuming that entry may execution on two or more execution units. In this case, the schedulers will have to arbitrate among themselves.

The schedulers decide which of the ready instructions will execute on which execution unit. The schedulers, for each entry of the reservation station 118, sent five dispatch signals (D0–D4) back to the ready logic 240 of the reservation station 118. The dispatch lines for entry 0 are illustrated in FIG. 5 and it is appreciated that 5 equivalent lines are provided for each other entry 1, 2.... 19 of the reservation station. Each dispatch signal refers to a separate execution unit that has been selected by the applicable scheduler. The dispatch signals D0–D4 are individually generated by schedulers 250(a)–250(e), respectively. These dispatch signals are asserted during the schedule stage for a given instruction and are often referred to as "schedule signals" for a given entry of the reservation station. For a given entry of the reservation station, only one of the five dispatch signals will be asserted at any given time. For instance, if entry 0 is scheduled to execute over execution unit 0, then the dispatch line (D0) for entry 0 will be asserted and forwarded from the scheduler 250(a) to the reservation station entry zero. In sum, a given entry of the reservation station has five Associated dispatch (schedule) lines and only one can be asserted at any given time. These schedule lines (D0–D5) are utilized by the early read embodiment of the present invention as will be discussed below; these schedule lines are used during the early reading of PDSTS from the reservation station for scheduling instructions that follow single cycle uops.

EARLY READ EMBODIMENT

Refer to FIG. 4. The above discussed early read operation of the reservation station to supply the PDST for instructions following scheduled single cycle instructions will now be discussed. The early read of the reservation station as discussed below supplies a PDST to one input of the MUX 220 while the other input arrives from the execution units. Except for the PDST column (d) of the reservation station memory array 118, all memory storage elements are based on a static memory storage technique that utilizes a precharge line supplied by the system clock. Therefore, data becomes available (e.g., valid data) from these columns at the rising edge of the clock signal. This type of clocked memory is utilized by the present invention reservation station because it is generally less complicated (logically) and consumes less substrate space as compared to memory storage techniques that are not clocked based. As referred to herein this memory storage technique is called a dynamic read because it involves the clock edge. It is appreciated that the early read embodiment of the present invention is utilized for back-to-back scheduling of instructions that are data dependent on single cycle instructions for maximum processing throughput.

The PDST column (d) of the reservation station of the early read embodiment of the present invention is implemented in SRAM and is not a dynamic read circuit and as such is not clocked based. Therefore, the PDST storage arrays may supply data within a given clock cycle before the rising edge of the next clock cycle. As referred to herein the memory storage technique for the PDST column is called the static read. The details of both the dynamic read memory cells and the static read memory cells of the present invention will be explained to follow.

Figure 6:
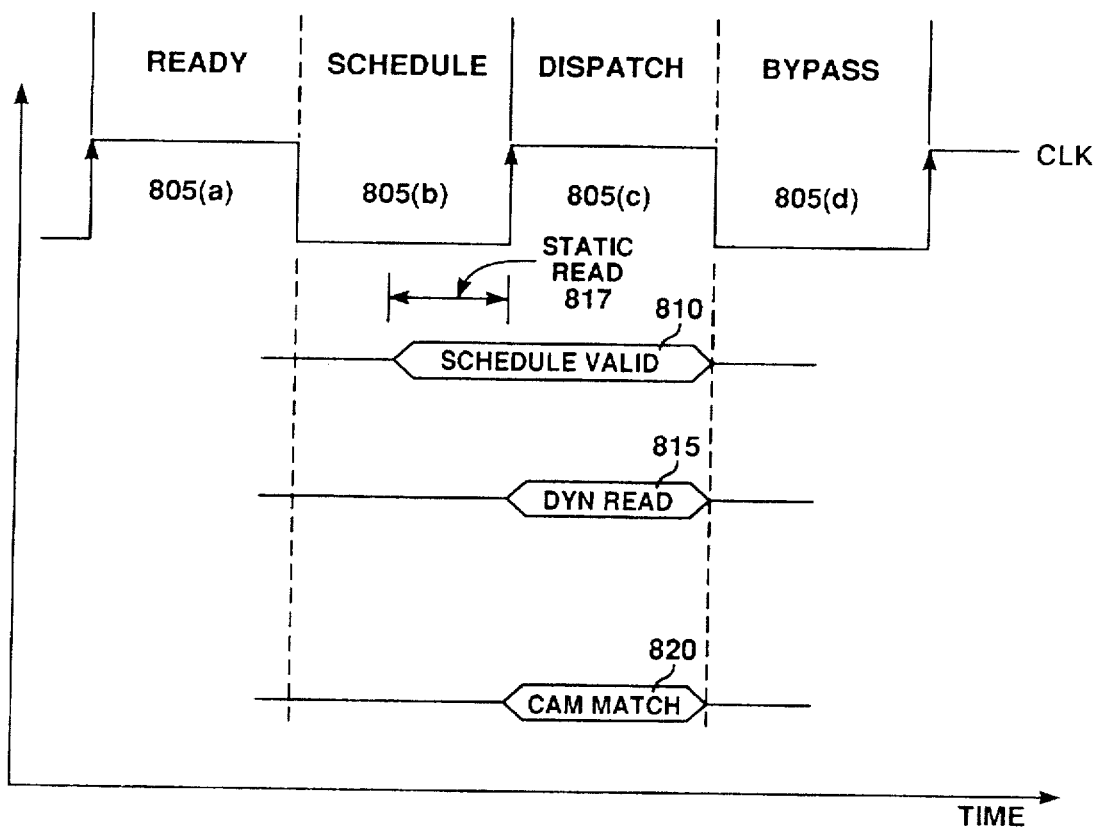
FIG. 6 is a timing diagram of valid states of the early read embodiment of the present invention.

Refer now to FIG. 6 and FIG. 3A. As discussed before with reference to the pipeline stages of the ADD instruction, the present invention must perform an early read of the reservation station in order to supply PDSTs (ROB$_7$) in time for the ready determination of the SUB instruction. The circuitry to perform this early read operation is triggered based on the assertion of the schedule line of the ADD instruction for the particular execution unit selected for the ADD instruction. Therefore, the read of the reservation station array for the ADD's PDST begins within the schedule stage of the ADD pipeline. If this read operation were dynamic (e.g., clock based) then the result of the read operation would not be supplied until the next rising edge of the clock, which would be at the start of the dispatch stage of the ADD instruction (which is also the same time as the start of the ready determination stage of the SUB instruction). But this read of the ADD's PDST would be much too late for the ready determination stage of the SUB instruction would need the PDST information BEFORE the start of its ready determination stage.

It is appreciated that other alternative embodiments of the present invention for providing a non-clocked read function include a self-timed clock circuit to supply the PDST information and also a clocked skewed circuit to supply the PDST information. The above two alternative embodiments provide output information not in coincidence with transitions of the system clock.

Refer to FIG. 6 which illustrates the timing more clearly. As shown across clock cycles 805(*a*)–805(*d*) are the READY, SCHEDULE, DISPATCH, and potential BYPASS stages for the ADD instruction. During cycle 805(*b*), one of the five schedule lines for the ADD instruction will become valid during timing duration 810 as a scheduler selects an execution unit for the ADD instruction. This will cause the present invention static read circuitry to supply the PDST from the reservation station associated with the ADD's entry. This occurs at duration 817. It is appreciated that during the dispatch of the ADD instruction at 805(*c*) a dynamic read operation 815 is performed by the present invention of the source data (if valid) within the reservation station in order to supply the execution unit with the required data It is appreciated that if the PDST column (d) of the reservation station was implemented by dynamic read memory (e.g., clocked memory) then the PDST would not be supplied until the start of cycle 805(*c*), which would be too late for the SUB's ready determination stage. Therefore, by providing a static read implementation, the present invention is able to supply the ADD's PDST during cycle 805(*b*) in time for the SUB's ready determination stage. At timing duration 820, the present invention performs a CAM2 match of the ADD's PDST against the sources of the valid entries of the reservation station. It is here that the ready determination for the SUB instruction is performed.

Figure 7:
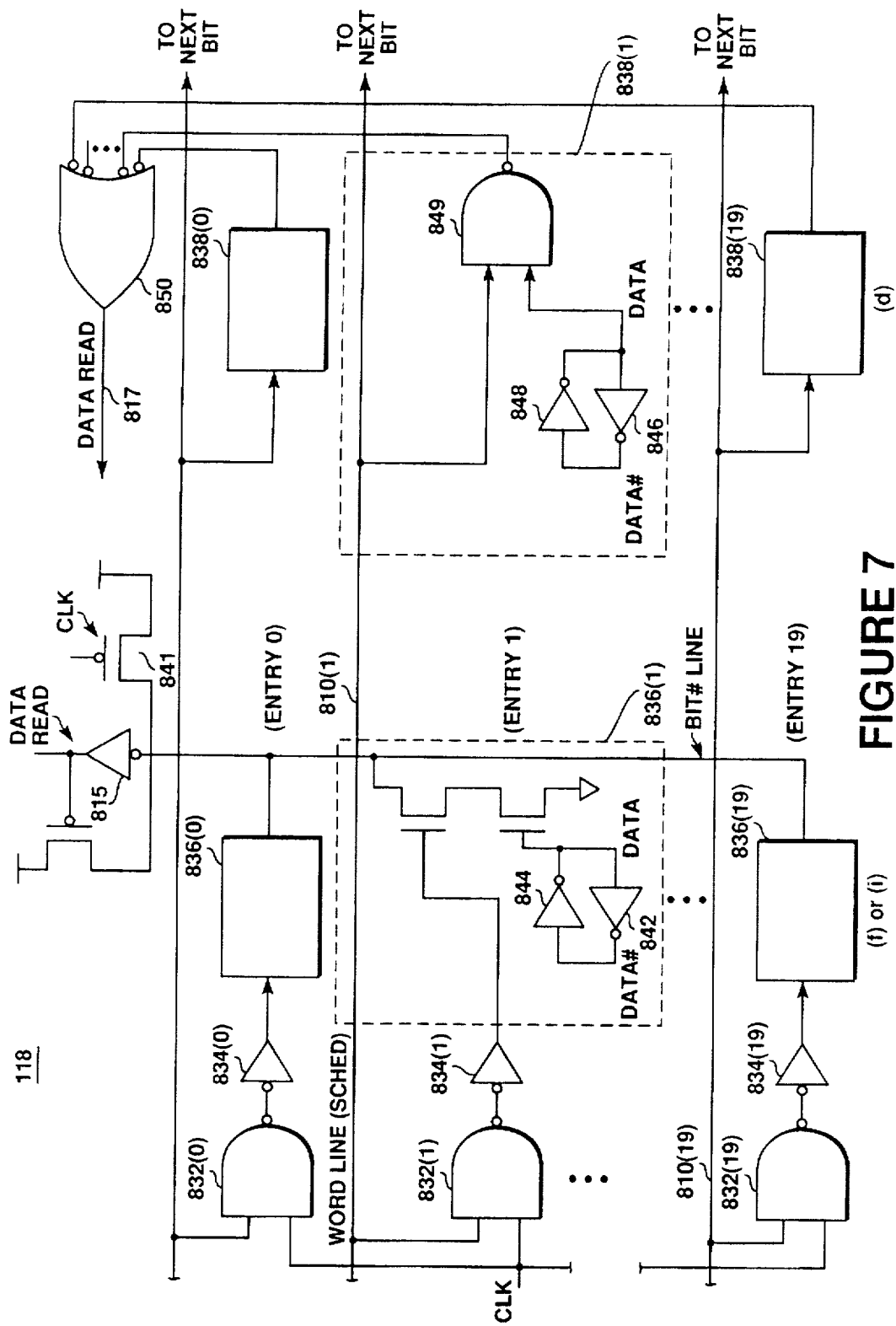
FIG. 7 is a logical block diagram of the clock memory and the non-clock memory implementation (within the reservation station) of the early read embodiment of the present invention.

FIG. 7 illustrates in detail the static (not clocked) and dynamic (clocked) memory storage implementations of the reservation station 118 of the present invention for a single bit of the PDST column (d) and for a single bit of another column, either column (f) or (i), or any other column that contains information that is not speed critical. It is appreciated that the circuitry illustrated and discussed herein is replicated (1) for each bit of the PDST column (d) and also (2) for each of the five schedule lines for each entry of the reservation station 118. It is further appreciated that since a multiple of instructions may be scheduled at the same time, the entire circuit as discussed above is replicated for each possible PDST supplied from the reservation station that is associated with a scheduled instruction. Therefore, FIG. 7 illustrates the logic for a given PDST read from the reservation station, for a given schedule line and for a given bit within the given PDST.

The clocked memory storage of the reservation station (e.g., columns (f) and (i) of 118) is now explained. Line 810(0) represents the schedule line (D0) for a given execution unit (EU0) for entry 0 of the reservation station. Line 810(1) is the schedule line for EUO for entry 1 and likewise line 810(19) is the schedule line for EUO for entry 19. Only one entry of the RS 118 can be scheduled to execute on a given execution unit at any given time, so only one line of 810(0)–810(19) is asserted at any given time for a given execution unit. The circuitry for each entry of the reservation station is analogous to that of entry 1, which will be described in detail herein. The schedule line 810(1) becomes asserted during timing 810 (of FIG. 6) as indicates that entry 1 is scheduled to execute over EUO. This line 810(1) is fed to NAND gate 832(1) and the output of the system clock (clk) (of FIG. 6) is fed into the other input of NAND gate 832(1). The output of the NAND gate 832(1) is fed to inverter 834(1) and then to dynamic memory bit 836(1) which is composed of two transistors and inverters 844 and 842 configured to retain a memory bit in a well known fashion. The write ports to the memory bits are not shown and may be implemented in a variety of well known fashions. The bit 836(1) represents a bit within the data column (f) or (i) of entry 1 of the RS 118. The memory bit is coupled to output line 815 which is precharged high by the clock signal applied through transistor 841; as such, and with respect to the NAND gate 832(1), the output of the dynamic memory cell 836(1) is synchronization (and in coincidence) with the clock signal. As discussed above, this circuit is replicated across each bit of the source data column (f) or (i) to supply the data for a dispatched entry (here entry 1). The data associated with bit 836(1) will be made available over line 815 in coincidence with the rising edge of the clock at the start of cycle 805(*c*) (of FIG. 6) when the instruction in entry 1 is dispatched, and the data read from these memory cells is therefore "clocked" with this clock. Line 815 is inverted and the data is read out of the inverter as part of a weak sustainer circuit. This is the dynamic read implementation of the present invention. The data output of the dynamic read operation for the source data columns supplies to the execution units.

It is appreciated that the above circuitry is replicated for each entry of the reservation station 118. The output of the bit 836(1) is tied to a precharged line 815 which is precharged by transistor 841 and the clock signal in a well known fashion. The bit data is supplied over line 815, ultimately from the reservation station to the EU0 when entry 1 is dispatched for execution. It is appreciated that the present invention utilizes the dynamic read (clock based) memory read technique for all columns of the reservation station 118 except for column (d).

Refer still to FIG. 7. The present invention also includes a static read cell that is not clock based and does not output information in coincidence with the system clock. This non1 clock based memory is used for the data of column (d) of the reservation station 118 for storing the PDST information. The schedule line 810(1) is fed into static memory cell 838(1) which is composed of two inverters 848 and 846 configured to retain a memory bit in a well known fashion. The schedule line is fed into one input of NAND gate 849 and the other input of the NAND gate 849 is from the memory bit configuration. When the schedule line 810(1) is asserted, the memory bit of storage cell 838(1) is supplied into one input of a NOR gate 850.

The same is true for all entries of the reservation station. The output of cells 838(0)–838(19) are sent to NOR gate 850 (or alternatively to a tree of gates that compose a NORing function). The output of NOR gate 850 is inverted and sent over line 817' and ultimately sent to the CAM2 logic used to compute the ready determination of the next instruction. The outputs 817' of the NOR gates 850 for each bit of the PDST is fed to an input of MUX 220 (see FIG. 4). It is appreciated that the logic shown in 838(1) for entry 1 is replicated for each bit required to contain the PDST information. Further, the logic is replicated for each entry of the reservation station. Finally, the total memory circuit is replicated for each PDST that needs to be read out from the reservation station early since the microprocessor of the present invention is superscalar.

Since the schedule line 810(1) is asserted during cycle 805(*b*) (of FIG. 6) and since the cell 838(1) does not require the clock to supply its data, the bit from cell 838(1) may be supplied in advance of the rising edge of the clock at the start of cycle 805(*c*) which is in time for the ready determination of the next instruction. The static read cell does not supply its information clocked (e.g. in coincidence) with the clock transitions but rather is responsive to the schedule line. The static read implementation of cell 838(1) is used for the PDST column (d) of the reservation station 118 and 838(1) represent but one bit and it is appreciated that the logic of FIG. 7 is replicated for each bit of the PDST column for entry 1 and for the other entries as well. The entire resultant circuit is also replicated for each PDST that must be read from the multiple instructions that can be dispatched at once. Therefore during interval 817 (of FIG. 6) the PDST from the reservation station of entry 1 is supplied over line 817' in advance of the next rising edge of the clock.

It is appreciated that one alternative to the above early read embodiment of the present invention would be to insert an extra clock cycle into the pipeline stage of the SUB instruction (that would delay the ready determination stage) so that a dynamic read of the PDST column (d) could be performed in time for the ready determination stage of the SUB instruction. However, this would not yield the maximum throughput for back-to-back execution of single cycle instructions and is not an acceptable solution.

On the other hand, the present invention's early read of the PDSTs of the reservation station using non-clocked static memory allows back-to-back execution of single cycle instructions that may be data dependent. The PDST from the ADD instruction is supplied to the ready determination state of the SUB instruction and the data returned by the ADD instruction will be routed to the input of the execution unit scheduled for the SUB instruction via the MUX 260 (in the fashion as discussed above). The present invention thus allows the SUB instruction to fully execute only consuming one clock cycle longer than the processing time of the ADD instruction, even though the SUB instruction is data dependent on the ADD instruction. This is maximum throughput for back-to-back scheduling of instructions that are data dependent on single cycle instructions.

NEXT POINTER EMBODIMENT

The early read embodiment of the present invention is used to provide the PDST information for a dispatched single cycle instruction in time to find data dependencies between another instructions (e.g., the ADD and SUB instructions). The next pointer embodiment of the present invention is used to perform a similar function and in this embodiment will replace the early read logic as described above. Otherwise, the remainder functions of the microprocessor 1101, reservation station 118, schedulers 250, ready logic 240, CAM matching, and other pertinent logic, will remain the same (to the extent not discussed as different herein). Therefore, these operations remaining common will not be repeated again.

Figure 8:
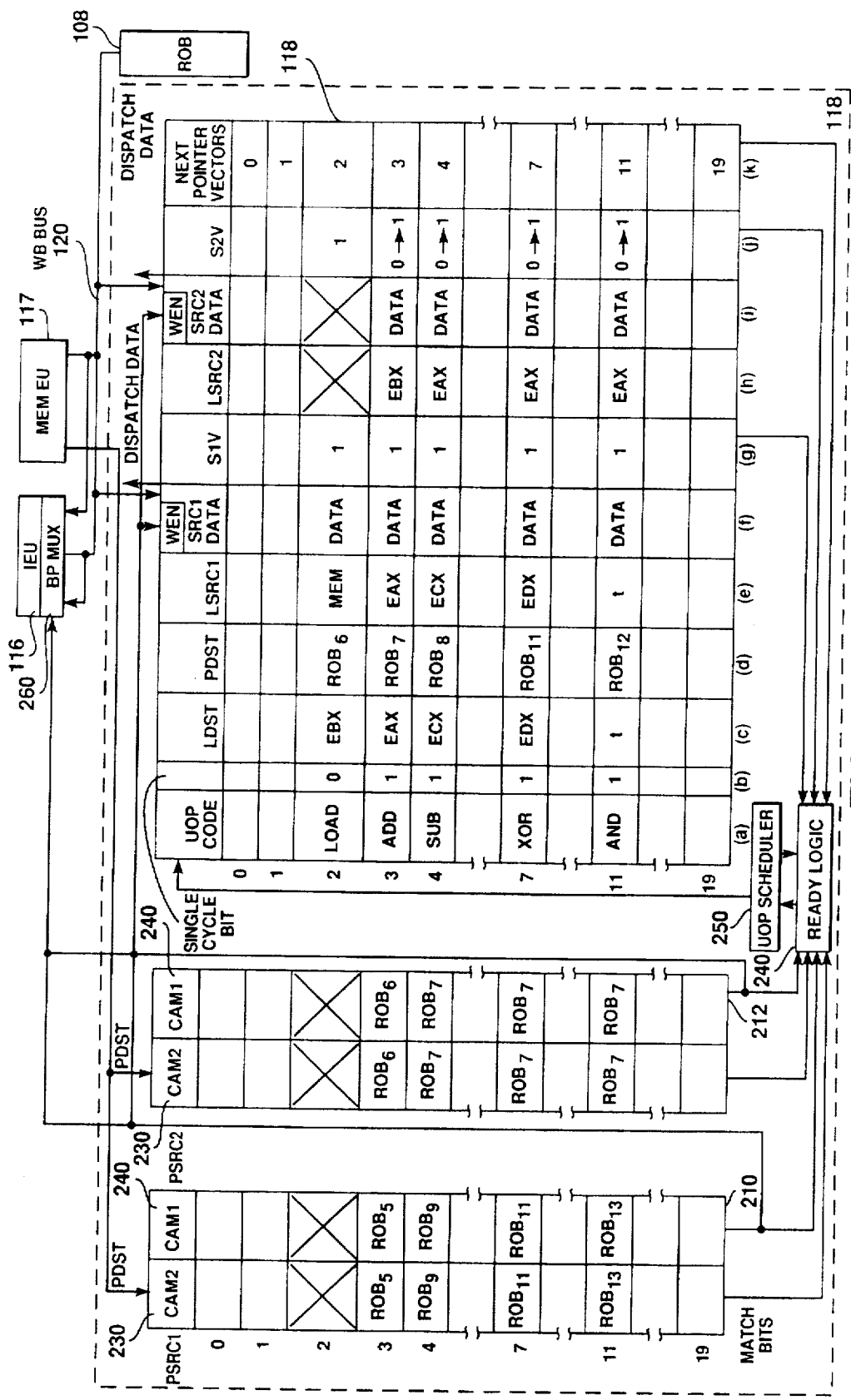
FIG. 8 is a logical diagram of the reservation station and the next pointer embodiment of the present invention which can be used in place of the early read mechanism.

With reference to FIG. 8, the next pointer embodiment of the present invention is illustrated. This embodiment utilizes an array of next pointer vectors stored in the reservation station as column (k) of 118. These next pointer vectors are coupled from buffer 118(k) to the ready logic 240. It is appreciated that each entry (0–19) of the reservation station buffer 118(k) contains two next pointer vectors SV1 and SV2 (one for each register source). As such, for example, entry 3 of 118(k) contains a separate next pointer vector for each source (EAX and EBX) of the ADD instruction. This next pointer buffer 118(k) supplies the data dependency information required to schedule instructions that follow a single cycle instruction. As such, it replaces the MUX 220 which, as shown, is removed from the circuit of FIG. 8. The ready logic 240 utilizes the next pointer vectors in determining the source availability of the instructions within the reservation station memory queue. A source can be available if its data is present within the queue, or a CAM1 match indicates its available, or a CAM2 match indicates that it is available or if a next pointer vector associated with a scheduled instruction indicates that the source is data dependent on the scheduled instruction. The ready logic 240 sends the source availability information to the scheduler 250. The next pointer buffer 118(k) contains two separate vectors (20 bits in length each) for each instruction within the reservation station and is updated on each clock cycle that new instructions arrive. Within the illustrated implementation, the reservation station may accept up to four instructions at a time during any given clock cycle.

Each bit in a next pointer vector represents a separate entry in the reservation station. For each instruction supplied to the reservation station during a given clock cycle there are two next pointer vectors. One vector (SV1) corresponds to the source1 values of the entries of the reservation station and the other vector (SV2) corresponds to the source2 values. For a given SV1 vector of a given instruction, the bits set in the vector represent all the instructions (e.g., entries) in the reservation station whose source1 registers are data dependent on the given instruction. Likewise, for a given SV2 vector of a given instruction, the bits set in the vector represent all the instructions (e.g., entries) in the reservation station whose source2 registers are data dependent on the given instruction. When an instruction is scheduled, its next pointer vectors within the corresponding entry of 118(k) are read by the scheduling logic in order to supply the ready logic 240 with data dependency information with which to use for scheduling the next instruction.

For example, assuming the ADD instruction is scheduled, its next pointer (SV2), which is stored in entry 3 of 118(k), would indicate a bit set in the 03 vector entry which indicates that the instruction in the reservation station entry 3 (the SUB) has a source2 that is data dependent on the ADD's result (e.g., EAX). This information is used by the ready determination logic to ready the SUB for scheduling next. It is appreciated that following a single cycle instruction, the next pointers replace the CAM2 matching circuitry. However, for other instructions that are not single cycle instructions (such as the LOAD instruction), the CAM2 logic is still used instead of the next pointers to determine data dependencies for scheduling next instructions. This is the case because the PDST of the LOAD instruction is still supplied two cycles before WRITE BACK in the next pointer embodiment of the present invention. The detailed operation of the next pointer buffer 320 in conjunction with the remainder of FIG. 8 will be described to follow.

Figure 9:
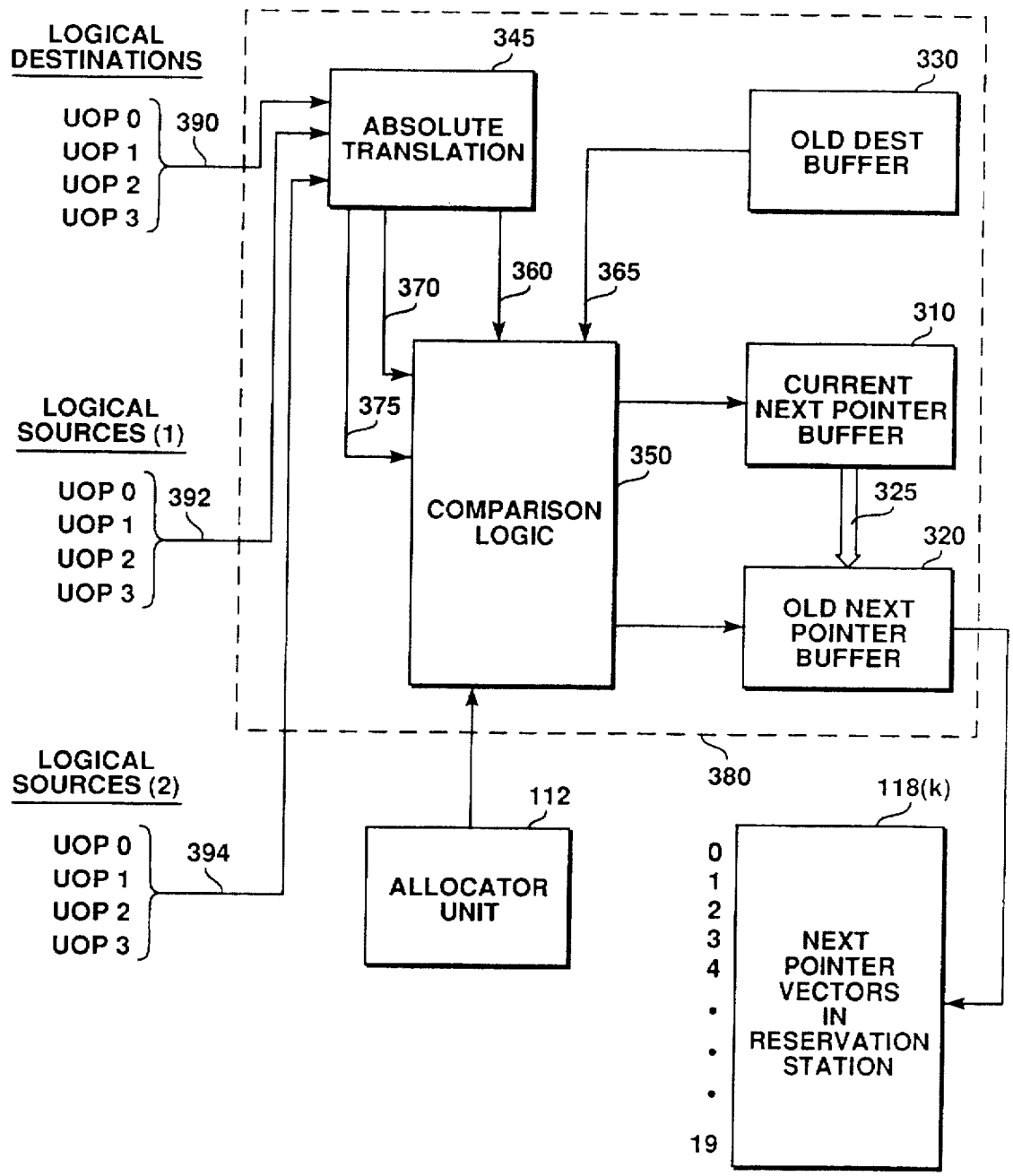
FIG. 9 is an illustration of the units used to generate the next pointer vectors within the next pointer embodiment of the present invention.

FIG. 9 illustrates the logic utilized by the next pointer embodiment to generate the next pointer vectors. Although the generation of the next pointer vectors is performed in the register alias table 114, according to the microprocessor architecture of FIG. 2A, this generation may be performed in any logical unit having access to the logical registers of a current set of instructions. The registers (source and destination) of buses 390, 392, and 394 are called logical registers (e.g., eax, ebx, ecx, etc.) because they are the registers designated before any renaming is performed by the register alias table 114. Registers renamed by the RAT 114 are called physical registers (e.g., PDSTs, PSRCs). Although for timing reasons the comparisons performed by block 350 are based on the logical register designations, in an alternative embodiment of the present invention, data dependencies could be found by comparison of the physical register designations as well (e.g., by using the renamed registers as determined by the RAT 114). Therefore both comparison techniques are considered within the scope of the present invention.

FIG. 9 illustrates that the logical destination registers of a set of four concurrently decoded instructions are supplied over bus 390. The logical source registers (for source1) for the set of instructions are supplied over bus 392 and the logical source registers (for source2) for the set of instructions are supplied over bus 394. These register designations are supplied to an Absolute Translation Unit 345 that is used for floating point registers that are stack referenced from a top of stack designator. If the registers are stack referenced then the unit 345 will translate them into absolute stack entry addresses. If the registers are not stack referenced (such as integer registers) then unit 345 acts as a straight through and no conversion of any sort is performed.

Absolute Translation Unit 394 outputs the logical destination registers over bus 360, the logical source registers (for source1) over bus 370, and logical source registers (for source2) over bus 375 for the current set of instructions. The logical register information becomes valid over the above buses at the end of the DECODE pipestage and at the start of the RENAME pipestage. It is appreciated that the logical register information for the current set of instructions is supplied in program code order because the current set of instructions are supplied to the circuit of FIG. 9 in program code order.

The data over the buses 360, 370 and 375 is fed to a comparison logic block 350 that compares the source registers of the current set of instructions to (1) the destination registers of the instructions of the current set and (2) the destination registers of the old (e.g., previously processed) set of instructions. These comparisons are performed simultaneously and are performed during the RENAME pipestage for the current set of instructions. The comparison is performed in order to locate data dependencies between the logical destinations of certain registers and the logical sources of other registers associated with subsequent instructions in the program order.

The comparison logic 350 is coupled to a current next pointer buffer 310 for receiving the result of the comparison of the source registers of the current set of instructions to the destination registers of the instructions of the current set of instructions. Also coupled to the comparison logic 350 is an old next pointer buffer 320 for containing the results of the comparison of the source registers of the current set of instructions and the destination registers of the old (e.g., previously processed) set of instructions as well as the data of buffer 310 for the old set of instructions. Buffer 320 is also coupled to receive data from buffer 310 over bus 325 and buffer 320 is also coupled to the ready logic 240 (as shown in FIG. 8.). Buffer 330 is used to receive the logical destinations of the old (previous) set of instruction as well as the entry numbers within the reservation station that correspond to the instructions of the old set of instructions; buffer 330 is coupled to the comparison logic 350 over bus 365. Collectively, the Absolute Translation unit 345, the comparison logic 350 the current and old next pointer buffers 310 and 320, and the old DEST buffer 330 are called the next pointer vector generation logic 380. An allocator unit 112 is coupled to comparison logic 350 which informs the components of the comparison logic of the entries within the reservation station into which the instructions of the current set have been assigned. The allocator 112 is coupled to the reservation station 118. This entry assignment information is used by the comparison logic in generation of the next pointer vectors. The allocation methodology may be in sequential order based on the entries that become vacant (e.g., when the corresponding previous instruction is dispatched for execution). However, any of a number of well known methods may be utilized to allocate the instructions into the vacant entries of the reservation station.

The next pointer vectors within the reservation station 118 at column (k) are coupled to the old next pointer buffer 320. The next pointer vectors within buffer 320 will be written into the corresponding entries of the reservation station (based on the instructions of the previous set of instructions). In this manner, the next pointer information within 118(k) is updated.

At the start of the RENAME pipestage for the current set of instructions, the data from buffer 310 is copied into buffer 320 and the contents of buffer 310 are cleared. The comparison logic 350 is then allowed to compute new data for buffer 310 based on the current set of instructions (the intracycle next pointers) and also simultaneously adds to the data within buffer 320 based on the logical destinations of the previous (old) set of instructions, which are supplied over buffer 330, and the sources of the current set of instructions (the intercycle next pointers). After the next pointers within buffer 320 are updated, buffer 330 is read to obtain the entry numbers within the reservation station 118 to which the instructions of the previous set of instructions belong. Using these entry numbers, the next pointer vectors of buffer 320 (for both source1 and source2) are loaded in the appropriate entry of buffer 118(k) of the reservation station. The above sequence will be explained in more detail to follow.

Figure 10A:
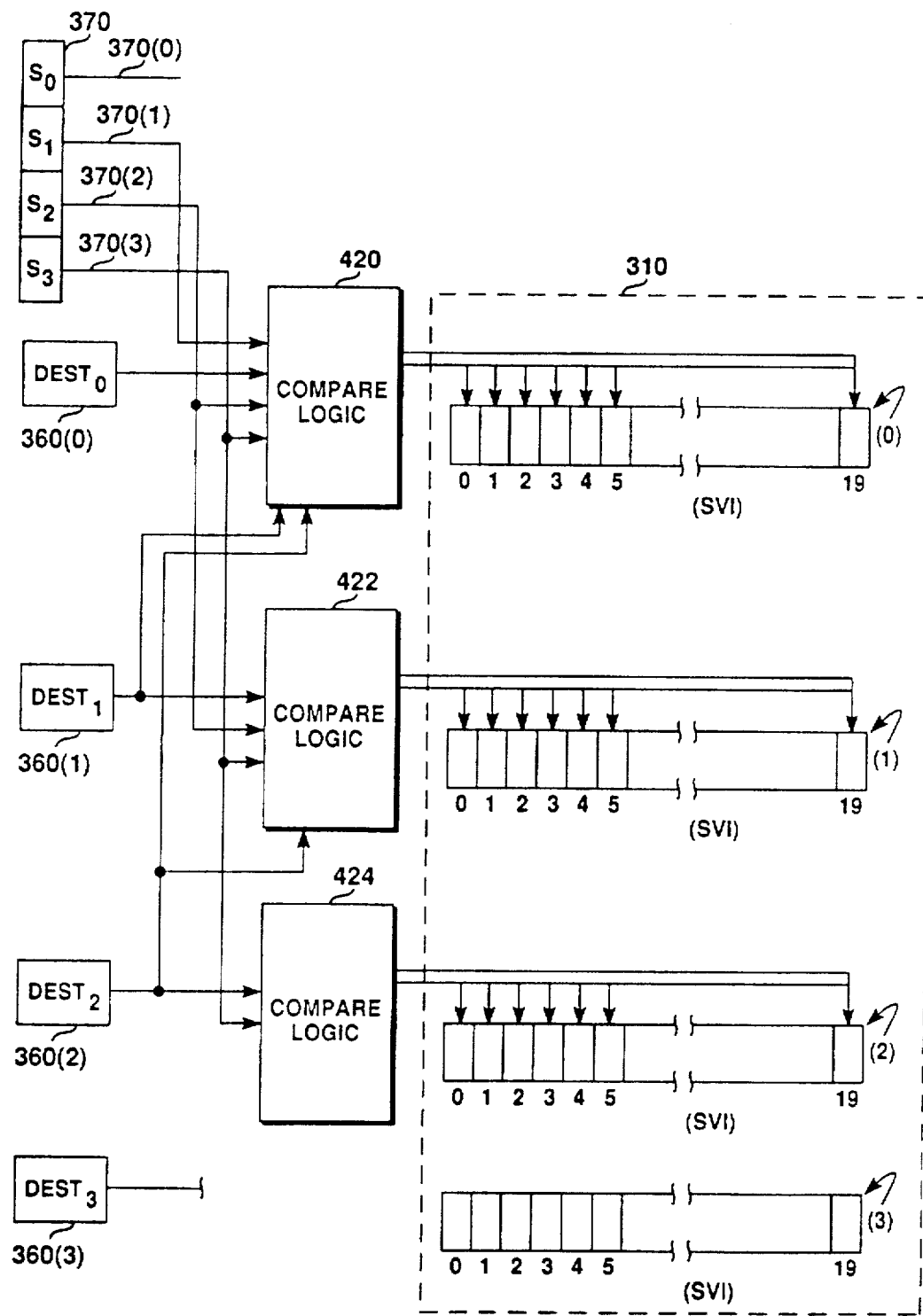
FIG. 10A illustrates an intracycle comparison stage for the first source for each instruction within a set of instructions within the next pointer embodiment of the present invention.

FIG. 10A illustrates the details of the comparison logic and the intracycle next pointer generation for the comparison of the sources of the current set of instructions to the destinations of the current set of instructions for the source1 values of buffer 310. The source1 values of the current set of instructions are compared against the intracycle destinations (e.g., the destination registers of the current set of instructions). Compare logic circuits 420, 422 and 424 are associated within block 350. Within memory array buffer 310 are the four next pointer vectors (each 20 bits in length) for the source1 values (e.g., SV1) for the current set of instructions. Each circuit block 420, 422 and 424 is coupled to receive information, from the allocator 112, regarding the reservation station entries allocated for each instruction of the current set of instructions. The registers S0–S3 represent the logical source1 register values for the four instructions of the current set. Registers Dest0–Dest3 represent the logical destination registers of the four instructions of the current set. Depending on the values of the registers supplied over buses 370(0)–370(3) and from 360(0) to 360(3), and from the allocator 112, the comparison logic will generate the next pointer vectors (0–3) for buffer 310.

For the remainder of the following discussion regarding FIG. 10A, Figure 10B, FIG. 11A and FIG. 11B the terminology Entry0, Entry1, Entry2, and Entry4 will correspond to the entries within the reservation station, supplied by allocator 112, for uop0, uop1, uop2, and uop3, respectively, of the current set of instructions; these values are supplied from the allocator 112 to each comparison logic circuit The entry number will correspond to the bit location within a given next pointer vector to set when a data dependency is located for a source of a data dependent instruction. Therefore, if uop3 (at Entry3) is has a source1 value that is data dependent on the result of uop1 (at Entry 1), then uop1's next pointer (SV1) will have a bit set in position 3 to indicate Entry3 (e.g., uop3) is data dependent, and so on.

Referring back to FIG. 10A, the logic of each of the blocks 420, 422 and 424 is explained. It is appreciated that since uop3 is the last received instruction, it does not have any data dependency information for intracycle instructions. Therefore, its next pointer (3) at this stage is empty. Circuit 424 generates the intracycle next pointer for source1 (SV1) associated with uop2; this is next pointer (2). If Dest2 360(2) equals source1 of uop3 (bus 370(3)) then the bit of next pointer (2) corresponding to Entry3 is set since the source1 of uop3 is data dependent on the result of uop2. Since only one instruction (uop3) follows uop2, there is only one bit set for next pointer (2).

Circuit 422 generates the intracycle next pointer for source1 (SV1) corresponding to uop1; this is next pointer (1). If Dest1 360(1) equals source1 of uop2 (over bus 370(2)) then the bit of next pointer (1) corresponding to Entry2 will be set since the source1 of uop2 is data dependent on the result of uop1. If Dest1 360(1) equals source1 of uop3 (over bus 370(3)), and further, Dest2 360(2) does not equal source1 of uop3, then the bit of next pointer (1) corresponding to Entry3 will be set since the source1 of uop3 is data dependent on the result of uop1. From above, there can be two bits set in intracycle next pointer (1) since uop3 and uop2 may follow uop1.

Circuit 420 constructs the intracycle next pointer for source1 (SV1) corresponding to uop0; this is next pointer (0). There can be three bits set for next pointer (0) because uop3, uop2, and uop1 may follow uop0. If Dest0 360(0) equals source1 of uop1 (over bus 370(1)) then the bit of next pointer (0) corresponding to Entry1 will be set since the source1 of uop1 is data dependent on the result of uopo. If Dest0 360(0) equals source1 of uop2 (over bus 370(2)), and further, Dest1 360(1) does not equal source1 of uop2, then the bit of next pointer (0) corresponding to Entry2 will be set since the source1 of uop2 is data dependent on the result of uop0. If Dest0 360(0) equals source1 of uop3 (over bus 370(3)), and further, neither Dest1 360(1) or Dest2 360(2) equals source1 of uop3, then the bit of next pointer (0) corresponding to Entry3 will be set since the source1 of uop3 is data-dependent on the result of uop0.

The generation circuitry of blocks 420, 422, and 424 operate simultaneously to generate the intracycle next pointers (0), (1), (2), and (3) corresponding to the source1 data dependencies. It is appreciated that a number of well known comparator circuits may be implemented by those skilled in the art based on the logical description of the circuit blocks 420, 422, and 424. Any of these well known techniques may be used within the scope of the present invention to generate the intracycle next pointers of buffer 310. As can be seen from an inspection of any next pointer vector (of (0), (1), (2), (3)) for a given instruction, it will indicate those entries within the reservation station that have source values that are data dependent on the result of the given instruction. The source1 values of these indicated instructions may then be indicated as valid in the ready determination logic immediately following the dispatch of the given instruction even though the resultant data for the given instruction has not yet been computed by the execution units.

Figure 10B:
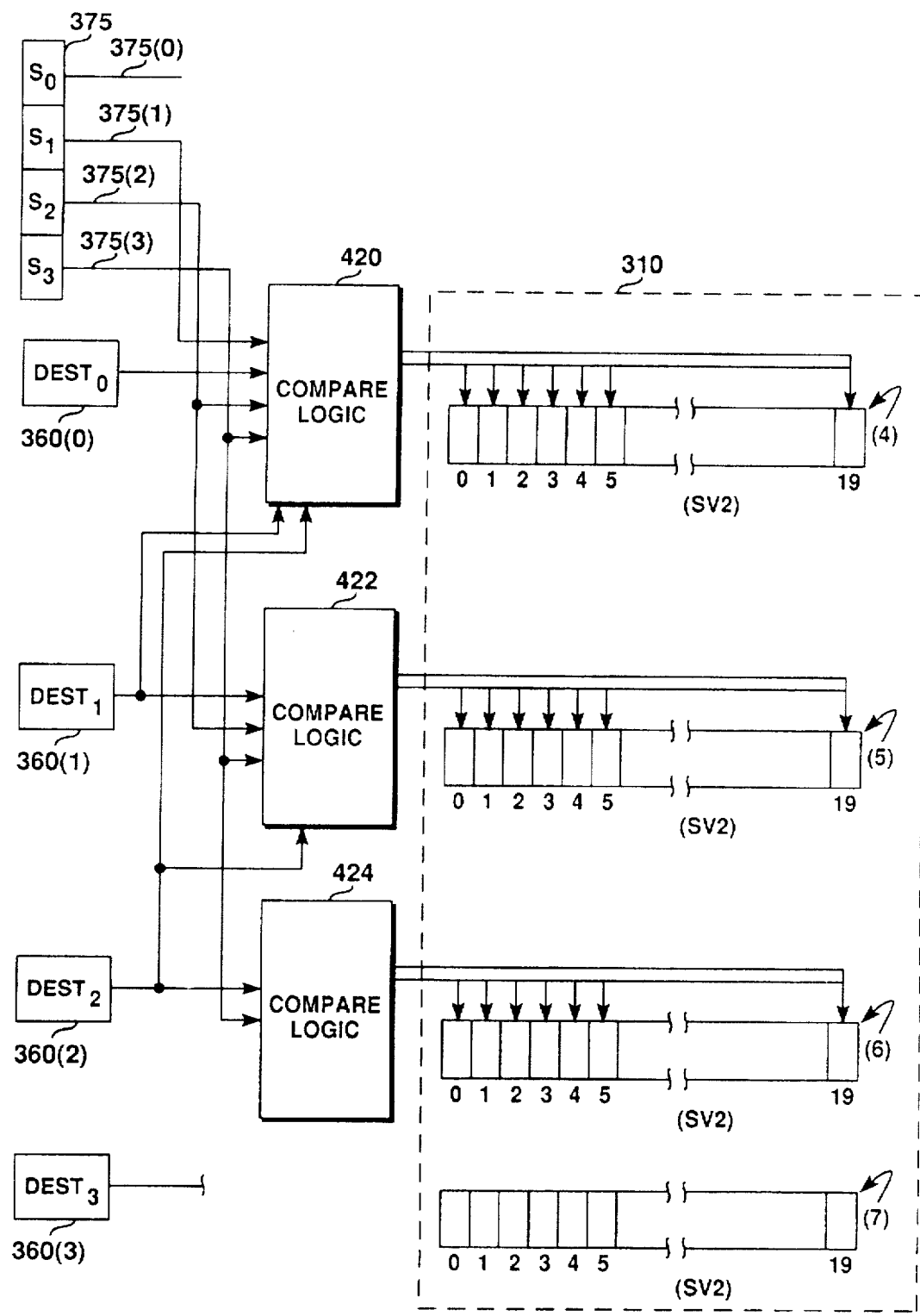
FIG. 10B illustrates an intracycle comparison stage for the second source for each instruction within a set of instructions within the next pointer embodiment of the present invention.

Refer to FIG. 10B which illustrates the logic utilized by the present invention to generate the intracycle next pointer vectors ((4), (5), (6), and (7)) of buffer 310 for the source2 data dependencies (e.g., the SV2 next pointers). The source2 values of the current set of instructions are compared against the intracycle destinations (e.g., the destination registers of the current set of instructions). The intracycle destination registers for FIG. 10B are the same as those of FIG. 10A. The logic used to generate the next pointers (4)–(7) is essentially analogous to that discussed with reference to FIG. 10A except the source inputs are taken over buses 375(0)–375(3) and represent the source2 values of the current set of instructions. Further, the four new next pointer vectors of buffer 310 created (e.g., vectors (4)–(7)) represent the source2 data dependencies for the instructions of the current set. The comparison logic circuit blocks 420–424 generate the new vectors simultaneously in an analogous fashion as described above with reference to FIG. 10A.

As can be seen from an inspection of any SV2 next pointer vector (of (4), (5), (6), (7)) for a given instruction, it will indicate those entries within the reservation station that have source2 values that are data dependent on the result of the given instruction. The source2 values of these indicated instructions may then be indicated as valid in the ready determination logic immediately following the dispatch of the given instruction, even though the resultant data for the given instruction has not yet been computed by the execution units.

Figure 11A:
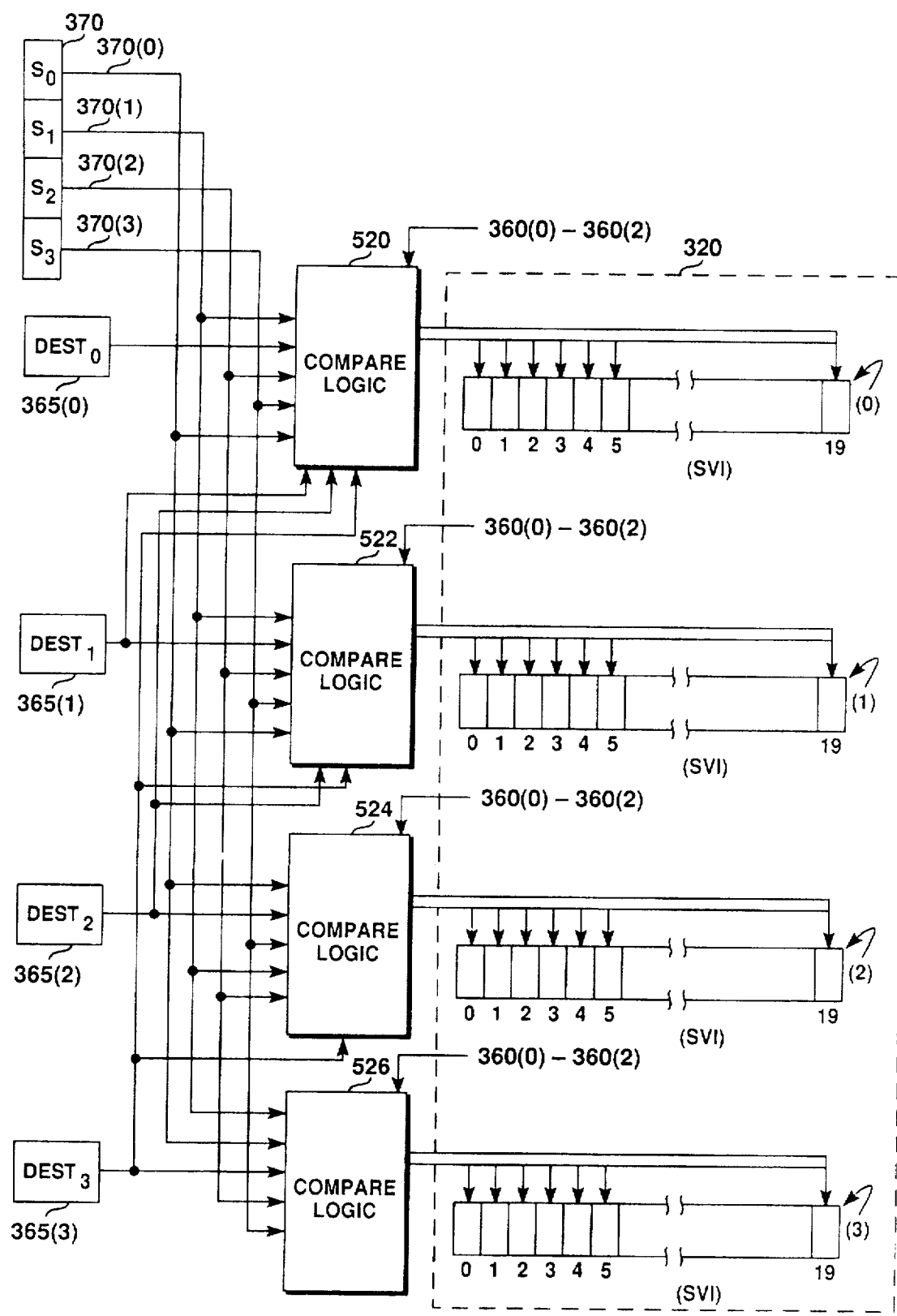
FIG. 11A illustrates an intercycle comparison stage for the first source for each instruction within a set of instructions within the next pointer embodiment of the present invention.
Figure 11B:
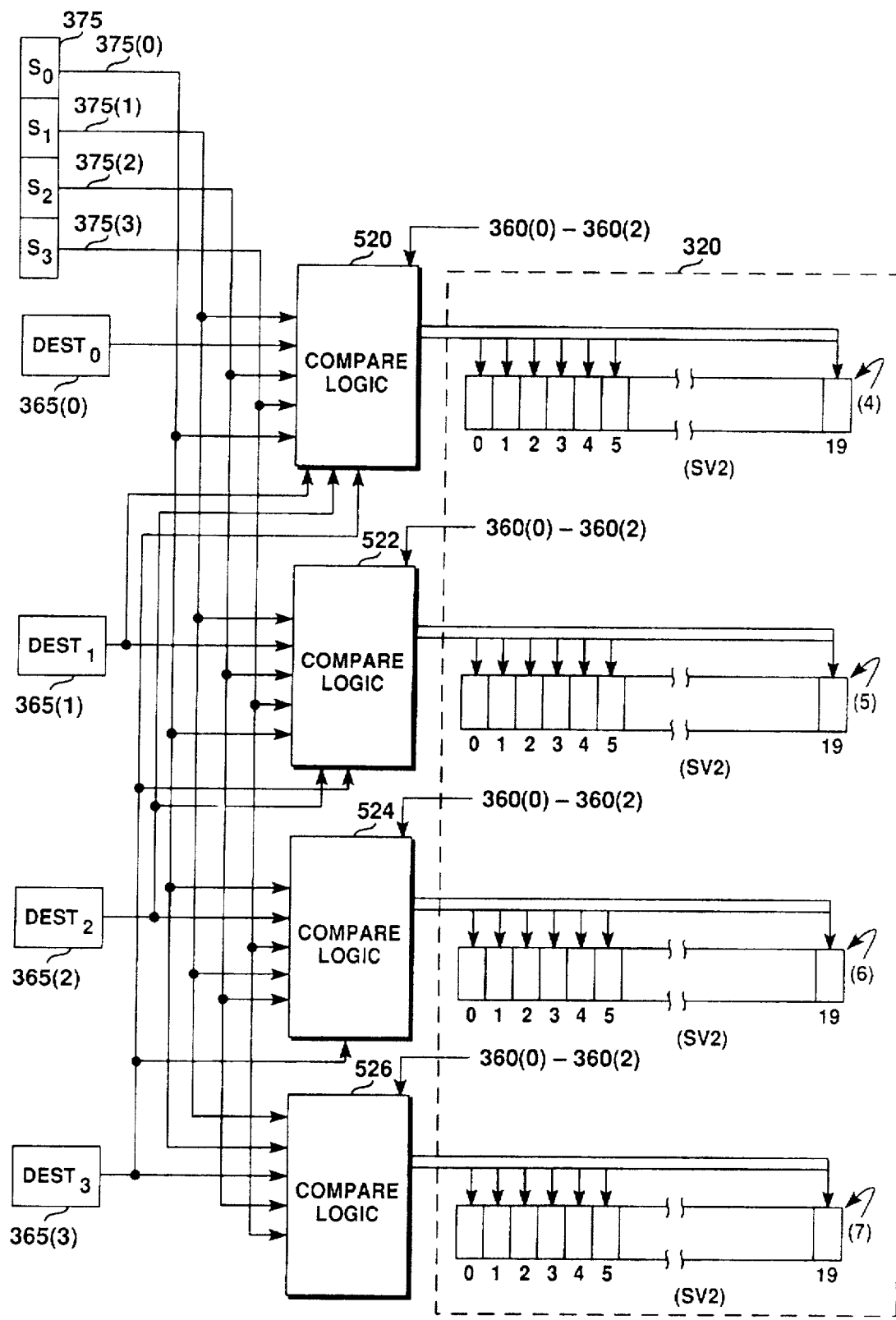
FIG. 11B illustrates an intercycle comparison stage for the second source for each instruction within a set of instructions within the next pointer embodiment of the present invention.

FIG. 11A and FIG. 11B illustrate the logic required to generate the intercycle next pointer vectors of buffer 320 for the current set of instructions. Circuits 520–526 generate the data dependency information for the current set of instructions based on the destinations of the previous set of instructions compared against the source registers of the current set of instructions. It is appreciated that the comparison circuits of FIG. 10A, Figure 10B, FIG. 11A and FIG. 11B operate simultaneously. The next pointers of buffer 320 represent the data of the next pointers of buffer 310 of the previous set of instructions added to the data generated by comparison logic circuits 520, 522, 524, and 526. In this fashion, the next pointers of buffer 320 represent the data dependencies for two cycles of instruction sets, the current set and the previous set. Entry0, Entry1, Entry2, and Entry3 from the allocator 112 are supplied to each logic block 520, 522, 524, and 526 and represent the entry numbers in the reservation station for the current set of instructions.

The Dest0–Dest3 values for FIG. 11A represent the destination registers of the previous set of instructions and are supplied over buses 375(0)–375(3), respectively, from the old Dest buffer 330 (of FIG. 9). The source values supplied to each of the comparison blocks are supplied over buses 370(0)–370(3) and represent the source1 values of the current set of instructions. FIG. 11A illustrates the logic utilized by the present invention to generate the intercycle next pointer vectors ((0), (1), (2), and (3)) of buffer 320 for the source1 data dependencies. The source1 values of the current set of instructions are compared against the intercycle destinations (e.g., the destination registers of the previous set of instructions). The results of the intercycle comparison is then written to the next pointer vectors within buffer 320 (e.g., by an OR function).

The compare logic 526 generates the intercycle data dependency information for next pointer (3) of buffer 320 which corresponds to uop3 of the previous set of instructions. Four bits of vector (3) of buffer 320 may be set by circuit 526. If Dest3 365(3) equals source1 of uop0 then the bit corresponding to Entry0 is set in vector (3) of buffer 320 since uopo of the current set is data dependent on uop3 of the previous set. If Dest3 365(3) equals source1 of uop1, and further, source1 of uop1 does not equal Dest0 360(0) of uop0, then the bit of vector (3) of buffer 320 corresponding to Entry1 is set since uop1 of the current set is data dependent on uop3 of the previous set. If Dest3 365(3) equals source1 of uop2, and further, source1 of uop2 does not equal Dest0 360(0) or Dest1 360(1), then the bit of vector (3) of buffer 320 corresponding to Entry2 is set since uop2 of the current set is data dependent on uop3 of the previous set. If Dest3 365(3) equals source1 of uop3, and further, source1 of uop3 does not equal Dest0 360(0) or Dest1 360(1) or Dest2 360(2), then the bit of vector (3) of buffer 320 corresponding to Entry3 is set since uop3 of the current set is data dependent on uop3 of the previous set.

The compare logic 524 generates the intercycle data dependency information for next pointer (2) of buffer 320 which corresponds to uop2 of the previous set of instructions. Four bits of vector (2) of buffer 320 may be set by circuit 524. If Dest2 365(2) equals source1 of uop0, and further, source1 of uop0 does not equal Dest3 365(3), then the bit corresponding to Entry0 is set in vector (2) of buffer 320 since uopo of the current set is data dependent on uop2 of the previous set. If Dest2 365(2) equals source1 of uop1, and further, source1 of uop1 does not equal Dest3 365(3) or Dest0 360(0), then the bit of vector (2) of buffer 320 corresponding to Entry1 is set since uop1 of the current set is data dependent on uop2 of the previous set. If Dest2 365(2) equals source1 of uop2, and further, source1 of uop2 does not equal Dest3 365(3) or Dest0 360(0) or Dest1 360(1), then the bit of vector (2) of buffer 320 corresponding to Entry2 is set since uop2 of the current set is data dependent on uop2 of the previous set. If Dest2 365(2) equals source1 of uop3, and further, source of uop3 does not equal Dest3 365(3) or Dest0 360(0) or Dest1 360(1) or Dest2 360(2), then the bit of vector (2) of buffer 320 corresponding to Entry3 is set since uop3 of the current set is data dependent on uop2 of the previous set.

Refer still to FIG. 11A. The compare logic 522 generates the intercycle data dependency for next pointer (1) of buffer 320 which corresponds to uop1 of the previous set of instructions. Four bits of vector (1) of buffer 320 may be set by circuit 522. If Dest1 365(1) equals source1 of uop0, and further, source1 of uop0 does not equal Dest3 365(3) or Dest2 365(2), then the bit corresponding to Entry0 is set in vector (1) of buffer 320 since uopo of the current set is data dependent on uop1 of the previous set. If Dest1 365(1) equals source1 of uop1, and further, source1 of uop1 does not equal Dest3 365(3) or Dest2 365(2) or Dest0 360(0), then the bit of vector (1) of buffer 320 corresponding to Entry1 is set since uop1 of the current set is data dependent on uop1 of the previous set. If Dest1 365(1) equals source1 of uop2, and further, source1 of uop2 does not equal Dest3 365(3) or Dest2 365(2) or Dest0 360(0) or Dest1 360(1), then the bit of vector (1) of buffer 320 corresponding to Entry2 is set since uop2 of the current set is data dependent on uop1 of the previous set. If Dest1 365(1) equals source of uop3, and further, source1 of uop3 does not equal Dest3 365(3) or Dest2 365(2) or Dest0 360(0) or Dest1 360(1) or Dest2 360(2), then the bit of vector (1) of buffer 320 corresponding to Entry3 is set since uop3 of the current set is data dependent on uop1 of the previous set.

The compare logic 520 generates the intercycle data dependency for next pointer (0) of buffer 320 which corresponds to uop0 of the previous set of instructions. Four bits of vector (0) of buffer 320 may be set by circuit 520. If Dest0 365(0) equals source1 of uopo, and further, source1 of uop0 does not equal Dest3 365(3) or Dest2 365(2) or Dest1 365(1), then the bit corresponding to Entry0 is set in vector (0) of buffer 320 since uop0 of the current set is data dependent on uopo of the previous set. If Dest0 365(0) equals source1 of uop1, and further, source1 of uop1 does not equal Dest3 365(3) or Dest2 365(2) or Dest1 365(1) or Dest0 360(0), then the bit of vector (0) of buffer 320 corresponding to Entry1 is set since uop1 of the current set is data dependent on uop0 of the previous set. If Dest0 365(0) equals source1 of uop2, and further, source1 of uop2 does not equal Dest3 365(3) or Dest2 365(2) or Dest1 365(1) or Dest0 360(0) or Dest1 360(1), then the bit of vector (0) of buffer 320 corresponding to Entry2 is set since uop2 of the current set is data dependent on uop0 of the previous set. If Dest0 365(0) equals source1 of uop3, and further, source1 of uop3 does not equal Dest3 365(3) or Dest2 365(2) or Dest1 365(1) or Dest0 360(0) or Dest1 360(1) or Dest2 360(2), then the bit of vector (0) of buffer 320 corresponding to Entry3 is set since uop3 of the current set is data dependent on uop0 of the previous set.

The generation circuitry of blocks 520, 522, 524, and 526 operate simultaneously to generate the intercycle next pointers (0), (1), (2), and (3) of buffer 320 corresponding to the source1 data dependencies for the current set of instructions. It is appreciated that a number of well known comparator circuits may be implemented by those skilled in the art based on the above logical descriptions and any of these well known techniques may be used within the scope of the present invention to generate the intercycle next pointers of buffer 320. As can be seen from an inspection of any next pointer vector (of (0), (1), (2), (3) of buffer 320) for a given instruction of the previous set of instructions, it will indicate those entries within the reservation station that have source1 values that are data dependent on the result of the given instruction. The source1 values of these indicated instructions may then be indicated as valid in the ready determination logic immediately following the dispatch of the given instruction, even though the resultant data for the given instruction has not yet been computed by the execution units.

Refer to FIG. 11B which illustrates the logic utilized by the present invention to generate the intercycle next pointer vectors ((4), (5), (6), and (7)) of buffer 320 for the source2 data dependencies. The source2 values of the current set of instructions are compared against the intercycle destinations (e.g., the destination registers of the previous set of instructions). The intercycle destination registers for FIG. 11B are the same as those of FIG. 11A. The logic used to generate the next pointers (4)–(7) of FIG. 11A is essentially analogous to that discussed with reference to FIG. 11A except the source inputs are taken over buses 375(0)–375(3) and represent the source2 values of the current set of instructions. Further, the four new next pointer vectors of buffer 320 created (e.g., vectors (4)-(7)) represent the source2 intercycle data dependencies for the instructions of the current set. The comparison logic circuit blocks 520–526 generate the new vectors simultaneously in an analogous fashion as described above with reference to FIG. 11A.

It is appreciated that the intercycle next pointer vectors (0)–(7) within buffer 320 is a combination of the results of the circuitry of FIG. 11A and 11B plus the values within buffer 310 that existed at the start of the given clock cycle. In effect, buffer 320, will contain the intercycle data dependency of the current set of instructions plus the intracycle data dependency information of the prior set of instructions (which was in buffer 310 at the start of the given clock cycle).

A next pointer vector contains as many bits as there are entries in the reservation station. For the source1 vectors, each bit set in a next pointer corresponding to a given instruction represents an instruction in the reservation station that has a source1 register that is data dependent on the result of the given instruction. For the source2 vectors, bits set in a next pointer represent those instructions in the reservation station that have source2 values that are data dependent on the result of the given instruction.

NEXT POINTER OPERATION

Figure 12A:
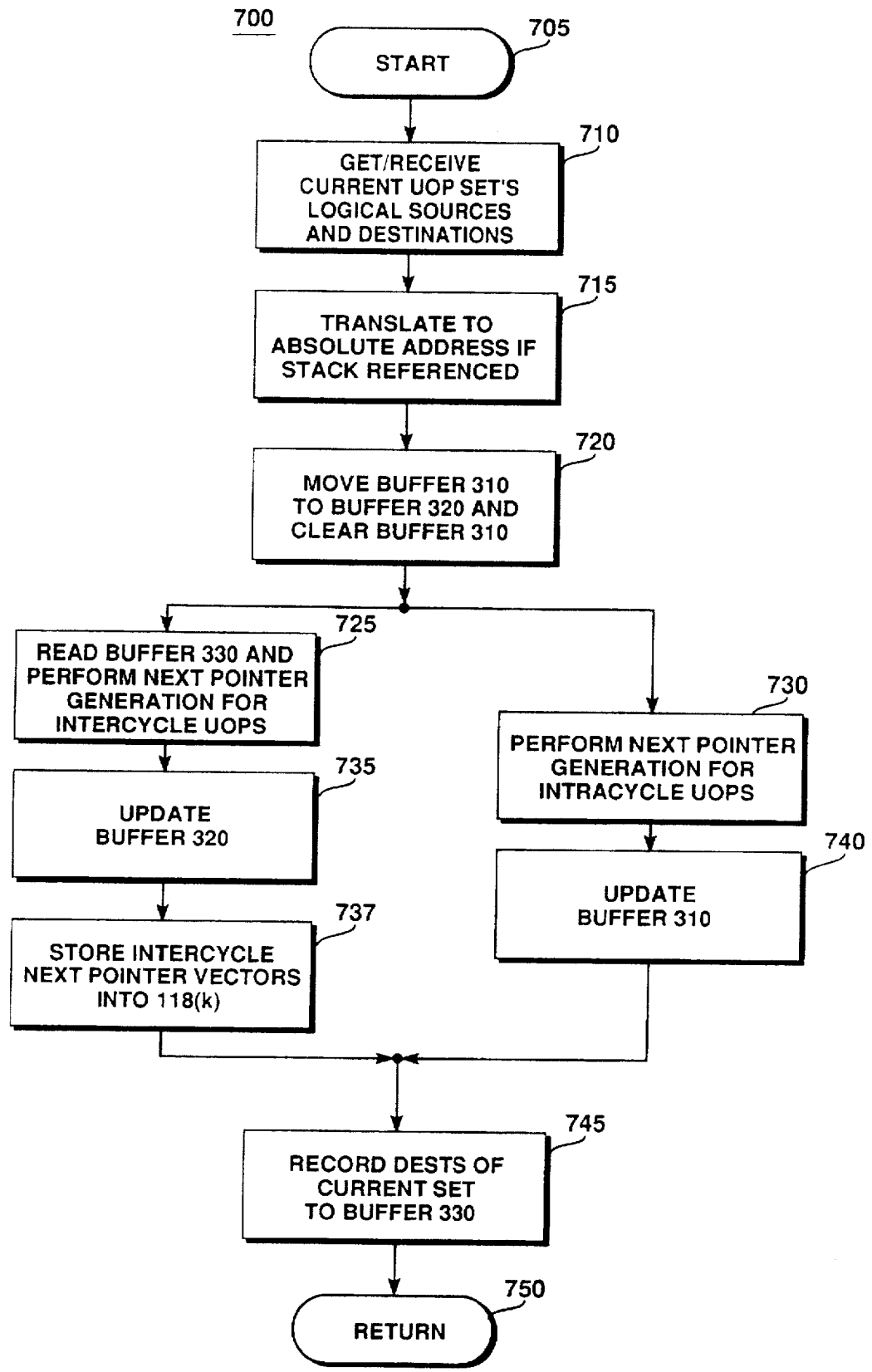
FIG. 12A is a flow chart illustrating processing tasks used by the present invention to generate next pointer vectors.
Figure 12B:
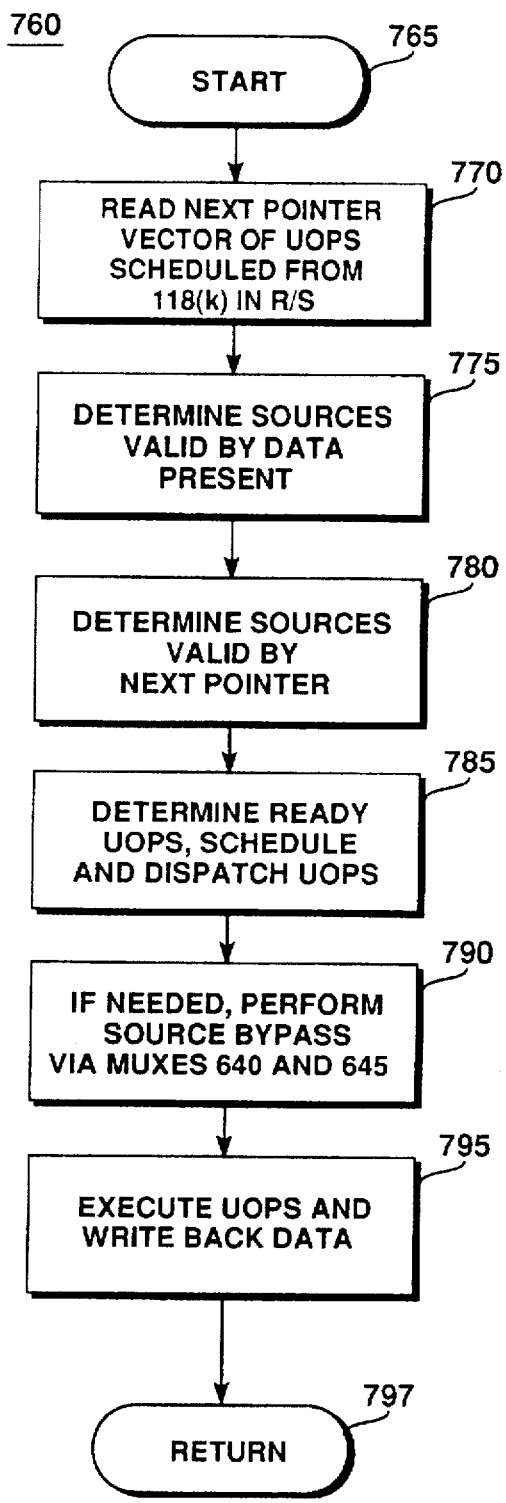
FIG. 12B is a flow chart illustrating the processing tasks used by the present invention for using the next pointer vectors for scheduling execution of instructions.

The flow diagrams of FIG. 12A and FIG. 12B illustrate processing tasks of the next pointer embodiment of the present invention and cover the generation of the next pointer vectors and the utilization (within the reservation station) of the next pointer vectors in the READY and SCHEDULE stages of the exemplary processor pipeline.

Refer to FIG. 12A where processing flow 700 (for next pointer generation) is illustrated which starts at block 705 and flows to processing step 710. At block 710 the start of a new clock cycle is encountered and a current set of instructions for processing is presented to the next pointer embodiment. At block 710, the present invention receives the current set of logical source register designations (over buses 392 and 394) and the current set of logical destination register designations (over bus 390). At block 715, the present invention performs any translations, if needed, on stack referenced registers so that the registers have absolute addresses. In the Intel microprocessor architecture the floating point registers are stack referenced and would be translated at block 715. At block 720, the present invention copies the next pointers (vectors (0)–(7)) of buffer 310 into buffer 320 and then clears buffer 310. If this is the first set of valid instructions, then at block 720 both buffers are cleared to zero.

Blocks 725 and 730 are performed simultaneously. At block 730, the present invention generates the next pointer vectors for buffer 310 by computing intracycle data dependencies. At block 730, the present invention compares the destination registers of the current set of instructions against the source registers of the current set of instruction and thereby generates next pointer vectors (0)–(7) of buffer 310. A separate next pointer vector is generated for each source register (e.g., source1 and source2) for each instruction of the current set. Simultaneously, at block 725 the present invention adds the intercycle data dependency information to the vectors stored in buffer 320 using an OR function to OR the results of block 725 with the data copied into buffer 320 by block 720. The destination registers from the previous set of instructions that were stored in buffer 330 are read and they are compared against the sources of the current set of instructions to generate the intercycle data dependencies. This information is added (e.g., via an OR function) to the vectors within 320 so that the next pointer vectors (0)–(7) of buffer 320 contain data dependency information for two cycles worth of instructions. At block 740 of FIG. 12A, the next pointers of the intracycle buffer 310 are updated and at block 735 the next pointers of the intercycle buffer 320 are updated.

At block 737, the present invention reads the reservation station entry numbers associated with the previous set of instructions from buffer 330. At block 737, the present invention utilizes these entry numbers to store the next pointer vectors (0)–(7) of buffer 320 into their appropriate entries within the reservation station buffer 118(k). Next pointer vectors (0)–(3) from buffer 320 are written into the SV1 location of the appropriate entries of buffer 118(k) and next pointer vectors (4–7) are written in the SV2 location of the appropriate entries of buffer 118(k). Each entry of buffer 118(k) contains a separate SV1 location and SV2 location to accommodate both sources for any given instruction in the reservation station. At block 745, the destination registers of the current set of instruction is written into the buffer 330 to replace the previous set. Also at block 745 the reservation station entry numbers (Entry0–Entry3) of the current set of instructions are written into buffer 330 to replace the previous set. The generation processing 700 returns at block 750. The next pointer vectors within buffer 118(k) can be read by the ready logic 240 at any time, except when the buffer 118(k) is being updated during block 745.

Refer now to FIG. 12B which illustrates the processing flow 760 for next pointer utilization within the reservation station 118. Flow 760 is utilized for the case of instructions following a single cycle instruction that has been scheduled for execution. The flow starts at block 765 and continues to block 770 where the present invention reads the next pointers of the instructions that have been scheduled for execution during the SCHEDULE pipestage. There are two applicable next pointer vectors for each scheduled instruction, one for the source1 and one for the source2 data dependencies; both of these are accessed and read by the ready logic 240.

The present invention at block 770 will read the next pointer vectors (within the reservation station buffer 118(k)) corresponding to the entry numbers of the scheduled instructions (e.g., single cycle instructions) and will analyze the set bits of the next pointer vectors for source1 and source2 data dependencies. The bits set in the next pointer vectors represent the entry numbers of the reservation station that contain instructions that are data dependent on the particular scheduled instruction. Specifically, a bit set in location x of one of the vectors (SV1) of buffer 118(k) indicates that the source1 register of the instruction at entry x of the reservation station is dependent on the outcome of a scheduled instruction. A bit set in location x of one of the vectors (SV2) of buffer 118(k) indicates that the source2 register of the instruction at entry x of the reservation station is dependent on the outcome of a scheduled instruction. This being the case, the set bits of the next pointer vectors for the scheduled instructions are fed directly to the ready determination logic 240 of the reservation station (see FIG. 8).

At block 775, the present invention determines which sources of the instructions pending in the reservation station are valid by having valid source data present in columns (f) and (i) of the reservation station. At block 780, the present invention determines which sources of the pending instructions of the reservation station are valid by having a corresponding bit set in an applicable next pointer vector of the scheduled instruction. For instance (refer to FIG. 8 and FIG. 3A), if a scheduled single cycle instruction (such as the ADD instruction) has a next pointer SV2 (within entry 3 of 118(k)) that has bit 4 set, that indicates that the source2 register of entry 4 of the reservation station 118 is data dependent on the ADD. The SUB instruction is at entry 4 and its source2 value is EAX which is the result of the ADD instruction. The ready determination logic will then recognize that source2 of the SUB instruction will be valid (available) in time for the EXECUTE stage of the SUB instruction and will therefore ready the SUB instruction for scheduling immediately following the scheduling of the ADD instruction (assuming the source1 of the SUB instruction was also valid). As a result of blocks 775 and 780 the following procedure may be utilized for source ready determination:

source ready=[ (source valid bit) OR (CAM2 match bit) OR
(CAM1 match bit) OR Next Pointer Bit ] AND RS Entry Valid An instruction becomes ready when both its source values are ready and its valid bit is valid. The instruction can be scheduled when it is ready and an appropriate execution unit is available. When ready, a corresponding ready signal is asserted to the schedulers 250.

At block 785 the present invention determines which entries of the reservation station 118 are ready by using the valid source data procedures as discussed above. At block 785, instructions are scheduled over a given dispatch port (of an execution unit) out of those instructions that are ready. The schedulers 250 perform this function. Also at block 785 the scheduled instructions are dispatched to the appropriate execution units. The source data from the reservation station 118 is fed to the execution units. At block 790, if needed, a source bypass via muxes 640 and 645 is performed so that data returning from an execution unit (from a previously dispatched instruction) can be routed directly into an execution for the currently dispatched instructions of block 785. For instance, at block 790, the data returning from the ADD instruction result will be routed to the execution unit allocated for the SUB instruction. It is appreciated that blocks 785 and 790 are performed simultaneously At block 795, the present invention executes the instructions that were dispatched and the data is written back into the reservation station 118 and the ROB 108 where appropriate. At block 797 the utilization flow 760 returns.

It is appreciated that flow 760 of the present invention and the next pointer vectors are most applicable for the ready determination of instructions that follow scheduled single cycle instructions. For other scheduled instructions that are not single cycle, the CAM2 and CAM1 circuitry as discussed above may be utilized by the present invention for the ready determination stages of the exemplary pipeline for instructions that do not follow single cycle instructions. Therefore, within the next pointer embodiment of the present invention, flow 760 should be viewed as an additional procedure offered by the present invention to perform efficient ready determination (for instructions that follow single cycle instructions), and is provided in addition to the CAM2 and CAM1 procedures discussed above.

COMPUTER SYSTEM

Figure 13:
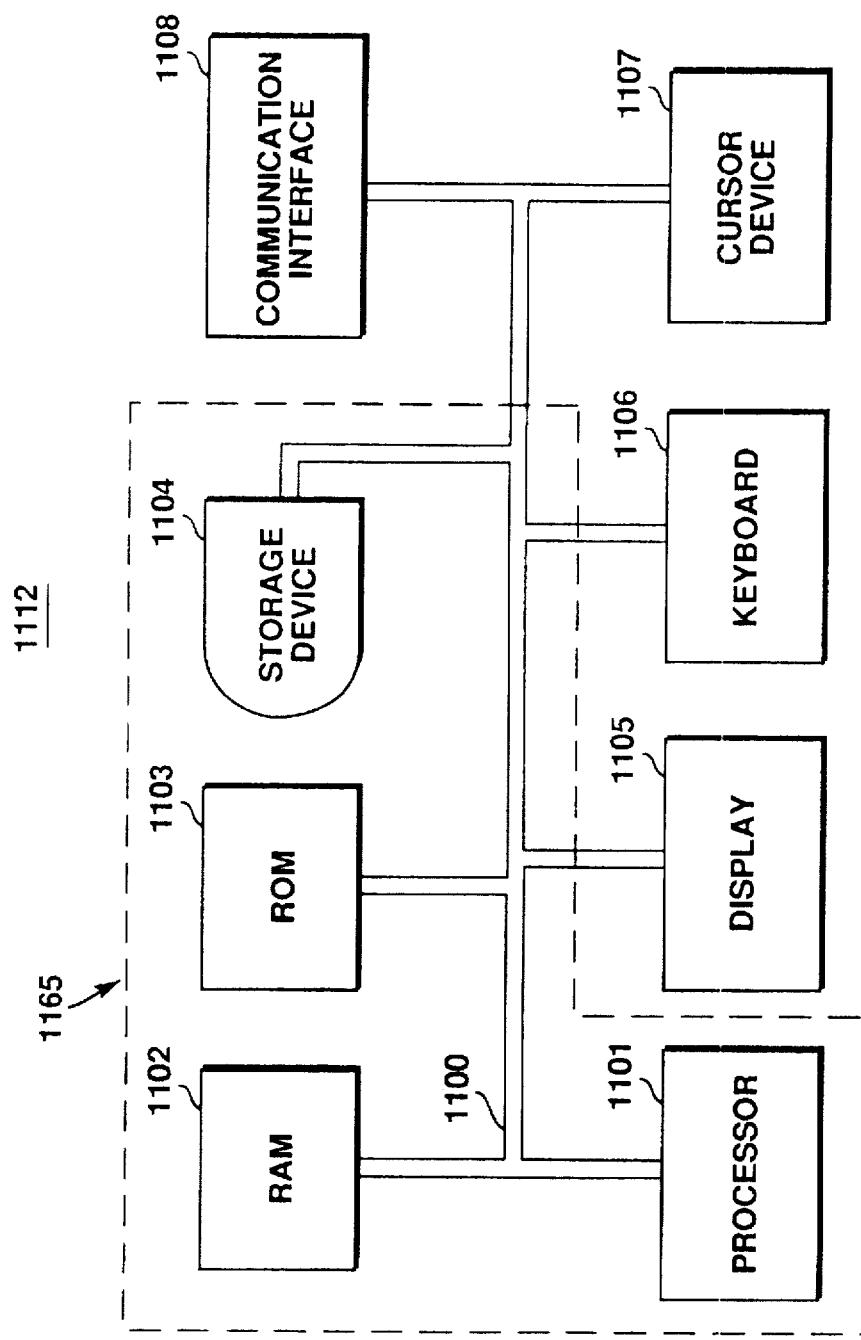
FIG. 13 is a general purpose computer system incorporating the pipeline processor that is implemented in accordance with the embodiments of the present invention.

The high performance microprocessor 1101 of the present invention, utilizing either the early read embodiment or the next pointer embodiment, may be added to a general purpose computer system as shown in FIG. 13 in order to increase processing speed of the computer system. Generally, the computer system 1112 of the present invention comprises an address/data bus 1100 for communicating information, a central processor, 1101 coupled with the bus for processing information and command instructions, a random access memory 1102 coupled with the bus 1100 for storing information and instructions for the central processor 1101, a read only memory 1103 coupled with the bus 1100 for storing static information and command instructions for the processor 1101. Also available for interface with the computer system 1112 of the present invention is a data storage device 1104 such as a magnetic disk or optical and disk drive which may be communicatively coupled with the bus 1100 for storing information and command instructions.

The display device 1105 utilized with the computer system of the present invention may be a liquid crystal device, cathode ray tube, or other display device suitable for creating graphic images and/or alphanumeric characters recognizable to the user. The computer system 1112 may also contain an alphanumeric input device 1106 including alphanumeric and function keys coupled to the bus 1100 for communicating information and command selections to the central processor 1101, a cursor control device 1107 coupled to the bus for communicating user input information and command selections to the central processor 1101 based on a user's hand movement. The cursor control device 1107 allowing the network user to dynamically signal the two dimensional movement of a visible symbol (pointer) on a display screen of the display device 1105 which may be used to select a particular station as a target address. Many implementations of the cursor control device are known in the art including a trackball, mouse, joystick or special keys on the alphanumeric input device 1105 capable of signaling movement of a given direction or manner of displacement.

The computer system 1112 of FIG. 13 also contains an input and output device 1108 coupled to the bus 1100 for communicating information to and from the computer system. The communication device 1108 may be composed of a serial or parallel communication port or may be a communication modem. It is appreciated that such communication device 1108 may provide an interface between the bus 1100 and the user interface devices keyboard 1106, cursor 1107, display 1105) of the computer system. In this case, the user interface devices will reside within a terminal device this is coupled to the communication device 1108 so that the processor 1101, the RAM 1102, the ROM 1103 and the storage device 1104 may communicate to the terminal and vice-versa. Components 1101, 1102, 1103, 1104, may be implemented on a single board or computer chassis 65 which is then coupled, via bus 1100, the other components of the computer system, such as units 1105, 1106, 1107 and 1108.

The preferred embodiment of the present invention, a non-clocked early read operation of a destination register associated with a dispatched instruction of a reservation station, is thus described. While the present invention has been described in particular embodiments, it should be appreciated that the present invention should not be construed as limited by such embodiments, but rather construed according to the below claims.

What is claimed is:

1. Within a memory unit having individual entries containing information pertaining to individual instructions to be executed in a multi-pipestage processor, an apparatus for supplying addresses of destination registers of scheduled instructions, said apparatus comprising:

a clock for synchronizing instruction pipestages;

a reservation station coupled to receive said clock, said reservation station comprising a first memory array and a second memory array;

said first memory array for supplying an address of a destination register of a scheduled single cycle instruction, wherein information supplied from said first memory array is not supplied in coincidence with transitions of said clock but upon a scheduling of said scheduled single cycle instruction;

said second memory array for supplying other information pertaining to said scheduled single cycle instruction, wherein information supplied from said second memory array is in synchronization with said transitions of said clock; and ready determination circuitry coupled to receive said address of said destination register for determining availability of source information for use by a second single cycle instruction that is to be scheduled single cycle subsequent to said scheduled instruction, wherein the second single cycle instruction is dependent upon a value produced by the execution of the scheduled single cycle instruction.

2. An apparatus for supplying addresses of destination registers of scheduled instructions as described in claim 1 wherein said first memory array further comprises circuitry for supplying said address of said destination register of said scheduled instruction before said scheduled instruction is dispatched.

3. An apparatus for supplying addresses of destination registers of scheduled instructions as described in claim 1 wherein said scheduled instruction is scheduled during a schedule pipestage of said instruction pipestages and wherein said first memory array further comprises read circuitry for supplying said address of said destination register of said scheduled instruction before said schedule pipestage ends.

4. An apparatus for supplying addresses of destination registers of scheduled instructions as described in claim 3 further comprising schedule logic for scheduling said scheduled instruction by asserting a schedule signal and wherein said first memory array supplies said address of said destination register in response to said schedule signal.

5. An apparatus for supplying addresses of destination registers of scheduled instructions as described in claim 3 wherein said scheduled instruction is a single cycle instruction.

6. An apparatus for supplying addresses of destination registers of scheduled instructions as described in claim 5 wherein said read circuitry supplies said address of said destination register in time to allow a subsequent instruction to be scheduled in a pipestage immediately following said schedule pipestage of said scheduled instruction.

7. An apparatus for supplying addresses of destination registers of scheduled instructions as described in claim 1 wherein said scheduled instruction is scheduled during a schedule pipestage of said instruction pipestages and wherein said first memory array further comprises circuitry for supplying said address of said destination register of said scheduled instruction before the start of a pipestage that immediately follows said schedule pipestage.

8. An apparatus for supplying addresses of destination registers of scheduled instructions as described in claim 1 wherein said first memory array is static random access memory and wherein said second memory array is static random access memory that utilizes a precharged output that supplies information in coincidence with transitions of said clock.

9. An apparatus for supplying addresses of destination registers of scheduled instructions as described in claim 1 wherein said information supplied by said second memory array is source data information pertaining to said scheduled instruction.

10. In a multi-pipestage processor having a schedule pipestage wherein individual instructions are scheduled to execute over a particular execution unit, an apparatus for determining source availability of instructions, said apparatus comprising:

a system clock for synchronizing instruction pipestages;

means for scheduling a first single cycle instruction for execution during a schedule pipestage of said first single cycle instruction;

a reservation station for containing instruction information pertaining to single cycle instructions to be executed, said reservation station comprising:

first read means for supplying a destination register address of said single cycle first instruction in response to said means for scheduling, wherein said first read means supplies information not in coincidence with transitions of said system clock but upon a scheduling of said scheduled first single cycle instruction, wherein said first read means supplies said destination register address to a ready determination means in time to allow said subsequent single cycle instruction to be scheduled during a pipestage immediately following said schedule pipestage of said first single cycle instruction; and second read means for supplying other information pertaining to said single cycle first instruction, wherein said second read means supplies said other information in synchronization with said transitions of said system clock.

11. An apparatus for determining source availability of instructions as described in claim 10 further comprising ready determination means for determining availability of source information pertaining to a subsequent instruction, said ready determination means coupled to receive said address of said destination register.

12. An apparatus for determining source availability of instructions as described in claim 11 wherein said ready determination means determines availability of source information pertaining to said subsequent instruction within an instruction pipestage that immediately follows said schedule pipestage of said first instruction.

13. An apparatus for determining source availability of instructions as described in claim 10 wherein said first instruction is a single cycle instruction.

14. An apparatus for determining source availability of instructions as described in claim 13 further comprising:

an execution unit selected for executing said subsequent instruction; and a bypass multiplexer coupled to said execution unit for supplying resultant information pertaining to said first instruction to said execution unit selected for executing said subsequent instruction.

15. An apparatus for determining source availability of instructions as described in claim 10 wherein said first read means supplies said destination register address before said schedule pipestage of said first instruction ends.

16. A multi-pipestage processor comprising:

a system clock for synchronizing instruction pipestages;

an instruction fetch and decode unit for accessing and decoding single cycle instructions;

an execution unit for executing single cycle instructions;

circuitry for scheduling a first single cycle instruction to be executed by said execution unit during a pipestage of said first single cycle instruction; and a reservation station for containing instruction information pertaining to single cycle instructions to be executed, said reservation station comprising:

first read means for supplying a destination register address of said first single cycle instruction in response to said circuitry for scheduling indicating that said first single cycle instruction is scheduled, wherein said first read means supplies said destination register address before said pipestage ends and not in coincidence with transitions of said system clock, wherein said first read means supplies said destination register address to a ready determination means in time to allow said subsequent single cycle instruction to be scheduled during a pipestage immediately following said schedule pipestage of said first single cycle instruction; and second read means for supplying other information pertaining to said first single cycle instruction, wherein said second read means supplies said other information in coincidence with transitions of said system clock.

17. A processor as described in claim 16 further comprising ready circuitry for determining source availability of a subsequent instruction and wherein said first read means supplies said destination register address to said ready circuitry in time to schedule said subsequent instruction during a subsequent pipestage immediately following said pipestage of said first instruction.

18. A processor as described in claim 17 wherein said first instruction is a single cycle instruction.

19. A processor as described in claim 17 wherein said first read means comprises a data output means and wherein said data output means supplies said destination register address.

20. A processor as described in claim 17 wherein said ready circuitry operates during a ready pipestage of said subsequent instruction and wherein said ready pipestage immediately follows said pipestage of said first instruction.

21. A processor as described in claim 17 wherein said first read means comprises a static random access memory that supplies said destination register address.

22. A processor as described in claim 21 wherein said second read means comprises a static random access memory having a precharged output that supplies said other information in synchronization with said transitions of said system clock.

23. A computer system comprising:
  an address/data bus for providing a communication pathway;
  a memory storage unit coupled to said bus for storing data to be processed and instructions for execution;
  a user interface coupled to said bus for displaying information to a user and for receiving information from said user;
  a multi-pipestage processor coupled to said bus for processing data and executing single cycle instructions, said processor comprising a system clock for synchronizing pipestages, circuitry for scheduling a first single cycle instruction during a pipestage, and a reservation station for containing instruction information pertaining to single cycle instructions pending execution, said reservation station comprising:
    first read means for supplying a destination register address of said first single cycle instruction in response to said circuitry for scheduling indicating that said first single cycle instruction is scheduled, wherein said first read means supplies said destination register address not in coincidence with transitions of said system clock but before said pipestage ends, wherein said first read means supplies said destination register address to single cycle a ready determination means in time to allow said subsequent single cycle instruction to be scheduled during a pipestage immediately following said schedule pipestage of said first single cycle instruction; and
    second read means for supplying other information pertaining to said first single cycle instruction, wherein said second read means supplies said other information in coincidence with transitions of said system clock.

24. A computer system as described in claim 23 further comprising ready circuitry for determining source availability of a subsequent instruction and wherein said first read means supplies said destination register address in time to schedule said subsequent instruction during a subsequent pipestage immediately following said pipestage of said first instruction.

25. A computer system as described in claim 24 wherein said first instruction is a single cycle instruction and wherein said first read means comprises a data output means and wherein said data output means supplies said destination register address.

26. A computer system as described in claim 24 wherein said ready circuitry operates during a ready pipestage of said subsequent instruction and wherein said ready pipestage immediately follows said pipestage of said first instruction.

27. A computer system as described in claim 24 wherein said first read means comprises a static random access memory that does not supply information clocked to said system clock and wherein said second read means comprises a static random access memory having a precharged output that supplies information in synchronization with said transitions of said system clock.

28. A method for supplying instruction information stored in a reservation station of a multi-pipestage processor wherein said reservation station contains information pertaining to instructions pending execution, said method comprising the steps of:
  synchronizing instruction pipestages of said processor by a clock;
  scheduling a first single cycle instruction, from said reservation station, for execution during a pipestage of said first single cycle instruction and asserting a first signal indicative thereof;
  supplying a destination register address of said first single cycle instruction from said reservation station in response to assertion of said first signal wherein said step of supplying said destination register address supplies said destination register address before said pipestage ends and not in coincidence with transitions of said clock; and
  supplying information pertaining to subsequently to be executed single cycle instructions related to said scheduled single cycle instruction in synchronization with transitions of said clock.

29. A method for supplying instruction information stored in a reservation station as described in claim 28 further comprising the steps of:
  determining source availability for readying a subsequent instruction for scheduling, wherein said step of determining source availability occurs during a subsequent pipestage immediately following said pipestage of said first instruction; and
  wherein said step of supplying said destination register address supplies said destination register address to said step of determining source availability.

30. A method for supplying instruction information stored in a reservation station as described in claim 29 wherein said first instruction is scheduled during a schedule pipestage of a pipeline processor and wherein said step of supplying said destination register address comprises the step of supplying said destination register address of said first instruction to said step of determining source availability in time to schedule said subsequent instruction during a subsequent pipestage immediately following said schedule pipestage of said first instruction.

31. A method for supplying instruction information stored in a reservation station as described in claim 29 wherein said step of supplying said destination register address utilizes a static random access memory and wherein said step of supplying said other information utilizes a static random access memory having a precharged output coupled to said clock.

32. A method for supplying instruction information stored in a reservation station as described in claim 28 wherein said step of supplying said destination register address comprises the step of supplying said destination register address of said first instruction before said first instruction is dispatched.

33. A method for supplying instruction information stored in a reservation station as described in claim 28 wherein said first instruction is a single cycle instruction.

34. A method for supplying instruction information stored in a reservation station as described in claim 33 wherein said step of supplying said destination register address supplies said destination register address in time to allow a subsequent instruction to be scheduled during a pipestage immediately following said pipestage of said first instruction.

35. A method for supplying instruction information stored in a reservation station as described in claim 28 wherein said step of supplying other information comprises the step of supplying source data information pertaining to said instruction.

36. A method for supplying instruction information stored in a reservation station of a multi-pipestage processor wherein said reservation station contains information pertaining to instructions that are pending execution, said method comprising the steps of:

synchronizing instruction pipestages of said processor by a clock;

scheduling a single cycle instruction from said reservation station for execution during a schedule pipestage of said single cycle instruction and generating a first signal indicative thereof;

supplying a destination register address from said reservation station in response to said first signal wherein said step of supplying said destination register address supplies said destination register address before said schedule pipestage ends and not in coincidence with transitions of said clock;

determining source availability of a subsequent instruction of said reservation station based on said destination register address, said step of determining source availability operable during a pipestage that immediately follows said schedule pipestage; and supplying source information pertaining to said single cycle instruction in coincidence with said transitions of said clock.

37. A method for supplying instruction information stored in a reservation station as described in claim 36 further comprising the step of scheduling said subsequent instruction during a pipestage immediately following said schedule pipestage of said single cycle instruction, provided said step of determining source availability indicates that sources pertaining to said subsequent instruction are available.

\* \* \* \* \*